(12) United States Patent
Fox, Jr.

(10) Patent No.: US 11,772,802 B2
(45) Date of Patent: Oct. 3, 2023

(54) RING RELEASE SYSTEMS AND METHODS UTILIZING A REMOVABLE PIN

(71) Applicant: Roy L. Fox, Jr., Belleville, WV (US)

(72) Inventor: Roy L. Fox, Jr., Belleville, WV (US)

(73) Assignee: Roy L. Fox, Jr., Belleville, WV (US)

( * ) Notice: Subject to any disclaimer, the term of this patent is extended or adjusted under 35 U.S.C. 154(b) by 0 days.

(21) Appl. No.: 17/499,183

(22) Filed: Oct. 12, 2021

(65) Prior Publication Data
US 2022/0024597 A1 Jan. 27, 2022

Related U.S. Application Data

(63) Continuation-in-part of application No. 17/385,038, filed on Jul. 26, 2021, now abandoned, which is a continuation of application No. 16/998,254, filed on Aug. 20, 2020, now Pat. No. 11,072,430.

(60) Provisional application No. 62/891,770, filed on Aug. 26, 2019.

(51) Int. Cl.
*B64D 17/38* (2006.01)
*F16G 11/10* (2006.01)

(52) U.S. Cl.
CPC ........... *B64D 17/386* (2013.01); *F16G 11/10* (2013.01)

(58) Field of Classification Search
CPC ....... F16G 11/10; B64D 17/386; B64D 17/54; B64D 17/38; B64D 17/62; B64D 17/76; B64D 1/12; F16B 45/002
See application file for complete search history.

(56) References Cited

U.S. PATENT DOCUMENTS

| | | | | |
|---|---|---|---|---|
| 2,725,204 A | * | 11/1955 | Horning | B64D 17/30 244/151 R |
| 2,825,515 A | * | 3/1958 | Gold | B64D 17/52 244/152 |
| 3,132,779 A | * | 5/1964 | Gray | A45F 3/047 224/267 |
| 6,644,597 B1 | * | 11/2003 | Bahniuk | B64D 17/38 244/151 B |
| 6,983,913 B2 | * | 1/2006 | Auvray | B64D 17/38 244/151 A |
| 9,676,487 B1 | * | 6/2017 | Fox, Jr. | B64D 17/38 |
| 9,789,968 B1 | * | 10/2017 | Fox, Jr. | B64D 17/38 |
| 2004/0050343 A1 | * | 3/2004 | Kurtgis | B64D 1/12 119/710 |
| 2004/0219812 A1 | * | 11/2004 | Marmaropoulos | H01R 13/6271 439/180 |
| 2014/0200499 A1 | * | 7/2014 | Champion | A63B 21/4009 602/36 |
| 2017/0252621 A1 | * | 9/2017 | Ross | A63B 69/0059 |

* cited by examiner

*Primary Examiner* — Assres H Woldemaryam
(74) *Attorney, Agent, or Firm* — Snell & Wilmer L.L.P.

(57) ABSTRACT

A ring release system is configured to releasably couple a parachute to a payload. The ring release system may comprise a series of release rings affixed to a riser. At least one release ring comprises a removable pin, permitting installation of the release ring after associated components have been stitched together, improving the reliability and manufacturability of the ring release system.

11 Claims, 25 Drawing Sheets

Front view

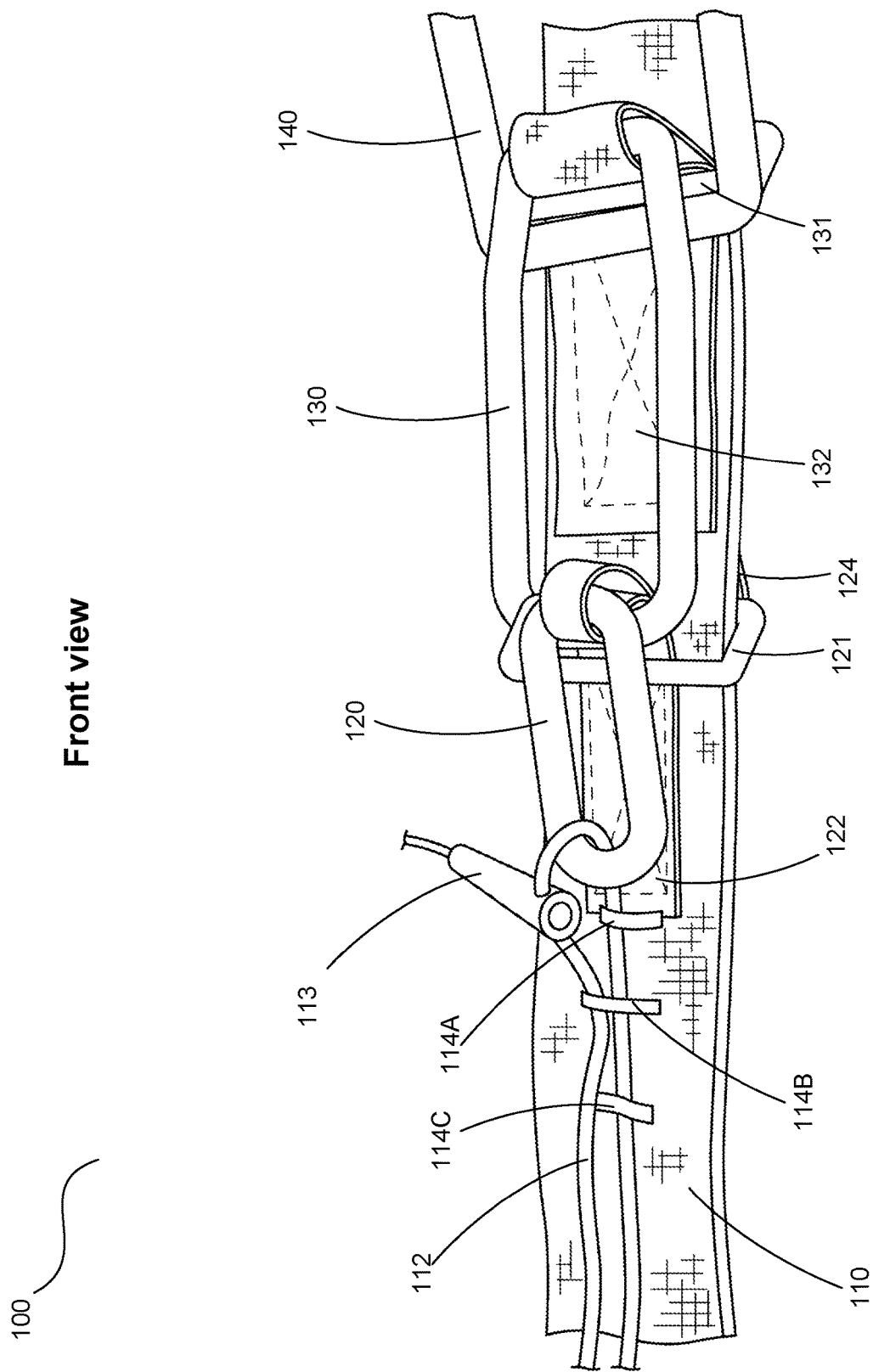

Rear view

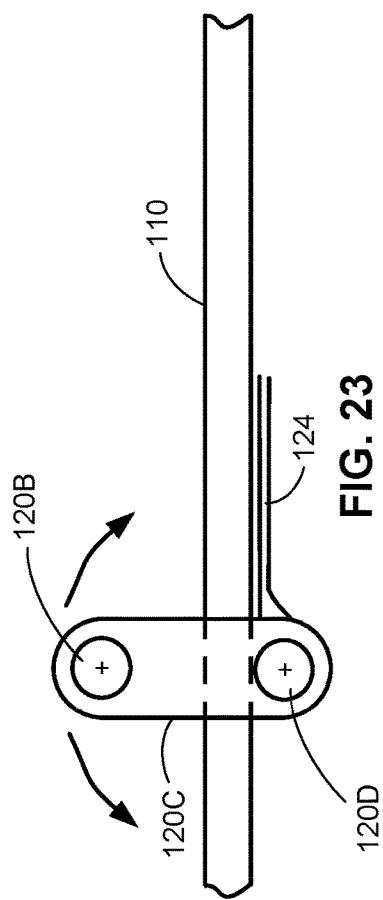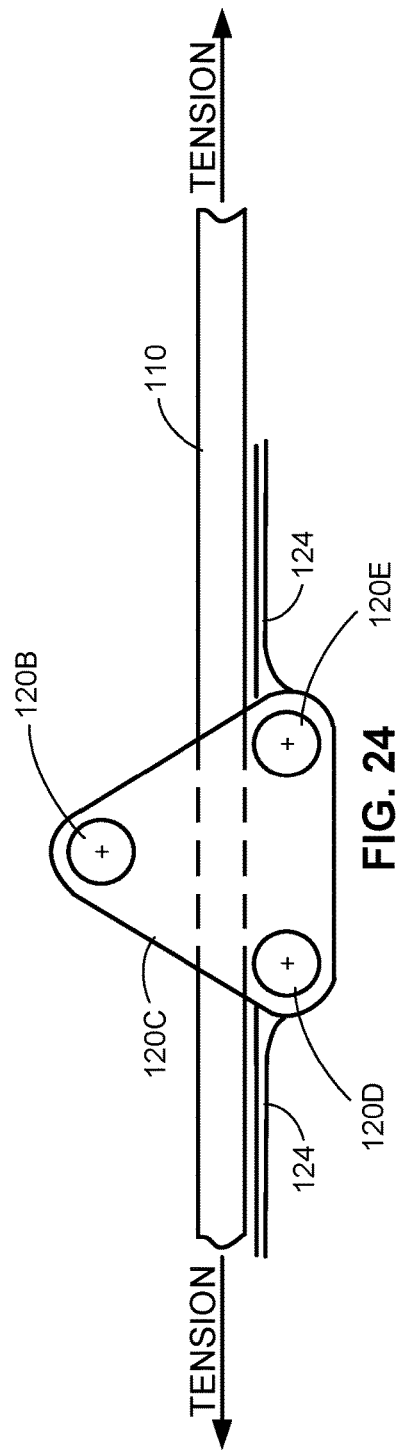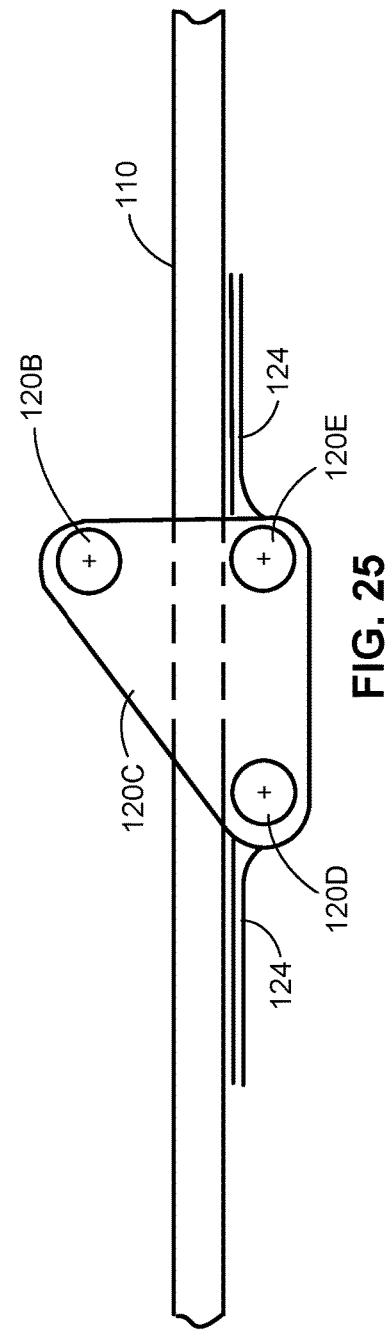

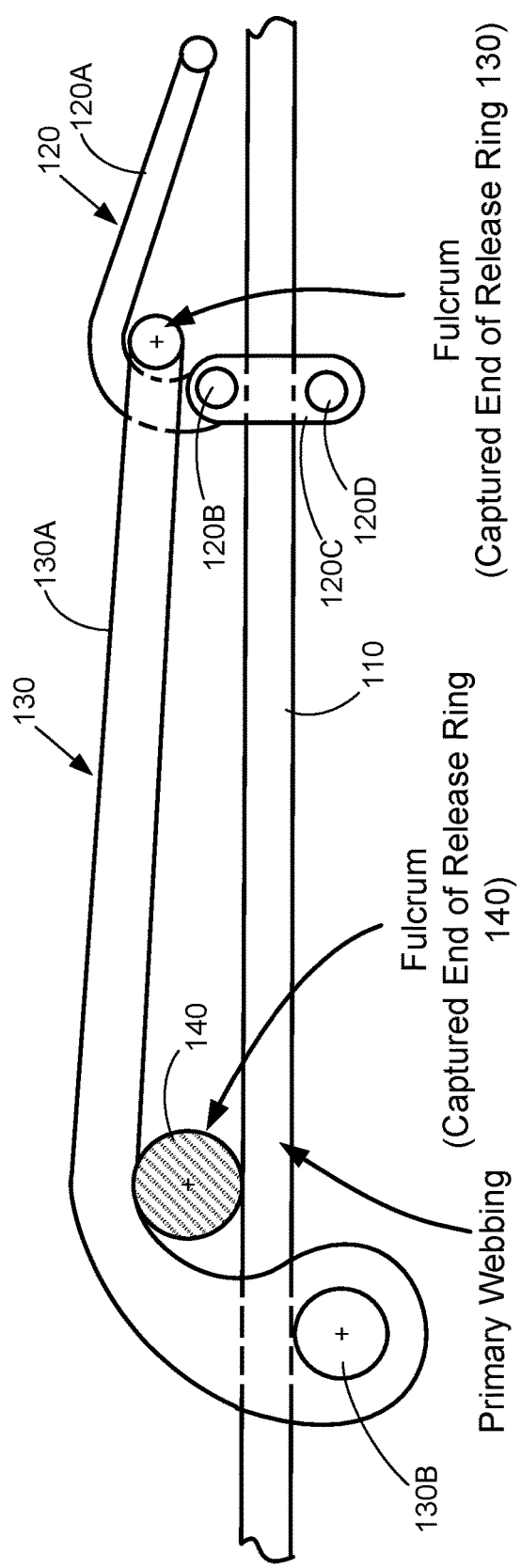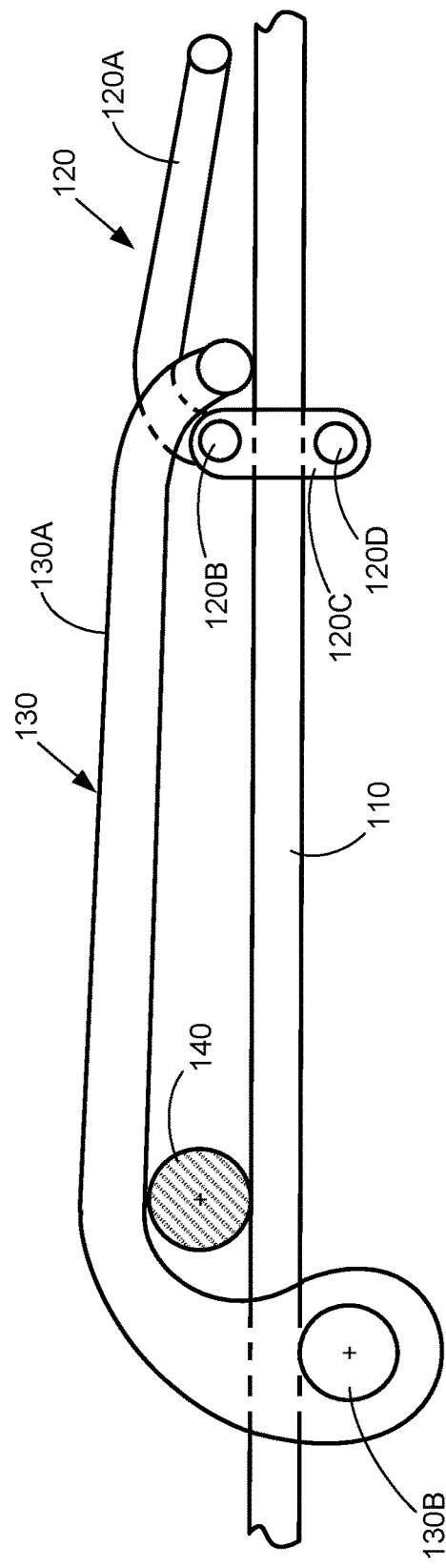

RING RELEASE SYSTEMS AND METHODS UTILIZING A REMOVABLE PIN

CROSS-REFERENCE TO RELATED APPLICATIONS

This application is a continuation-in-part of U.S. Ser. No. 17/385,038 filed on Jul. 26, 2021, entitled "Ring Release Systems and Methods." U.S. Ser. No. 17/385,038 is a continuation of U.S. Ser. No. 16/998,254 filed on Aug. 20, 2020, now U.S. Pat. No. 11,072,430 entitled "Ring Release Systems and Methods." U.S. Ser. No. 16/998,254 claims priority to and the benefit of U.S. Provisional Application No. 62/891,770 filed on Aug. 26, 2019 entitled "Ring Release Systems and Methods." The foregoing applications are hereby incorporated by reference in their entirety (except for any subject matter disclaimers or disavowals, and except to the extent of any conflict with the disclosure of the present application, in which case the disclosure of the present application shall control).

TECHNICAL FIELD

The present disclosure relates to ring-based release systems, and particularly to systems and methods for releasing parachutes from payloads.

BACKGROUND

When a personnel parachute malfunctions, a common recovery protocol is to release the failed chute from the parachutist and deploy a reserve chute. One prior release system utilized for this purpose is a 3-ring release system, for example as disclosed by Booth (U.S. Pat. No. 4,337,913) or Auvray (U.S. Pat. No. 6,983,913). However, these and other prior ring release systems suffer from various deficiencies. More generally, a variety of situations may arise where two coupled objects may desirably be released from one another. Accordingly, improved release systems and methods of use thereof are desirable.

SUMMARY

A ring release system and methods for use of the same are provided. In an exemplary embodiment, a ring release system comprises a riser comprising webbing, the riser having a top and a bottom, and a first release ring comprising a ring body and a removable pin, wherein the first release ring is coupled to the riser via a first attachment webbing passing around the removable pin and stitched to the riser.

In various embodiments, the first release ring is configured with a J-shape when viewed in a direction sideways to the top-to-bottom direction of the riser. In various embodiments, the first release ring is detachable from the riser by detaching the removable pin from the ring body. In various embodiments, the riser comprises multiple plies, and wherein the first attachment webbing is stitched to the riser between plies of the riser. In various embodiments, the first attachment webbing is disposed on the back side of the riser. In various embodiments, the ring release system further comprises a second release ring coupled to the riser via a second attachment webbing stitched to the riser, wherein the first release ring and second release ring are cascadingly rotatable with respect to the riser responsive to release of a retaining mechanism. In various embodiments, the ring release system further comprises a third release ring coupled to the riser, wherein the third release ring is cascadingly rotatable with respect to the riser responsive to rotation of the second release ring. In various embodiments, the stitching coupling the first attachment webbing and the riser cannot be placed in peel responsive to force applied to the ring body along a top-to-bottom direction of the riser. In various embodiments, the ring body is configured with a U-shape, and wherein the removable pin passes through a pair of apertures located toward the distal ends of the U shape.

In a further exemplary embodiment, a ring release system comprises a riser comprising webbing, the riser having a top and a bottom, and a first release ring. The first release ring comprises a ring body, a first pin, a second pin, and a pair of side plates coupling the first pin and the second pin. The first release ring is coupled to the riser via a first back webbing passing around the second pin and stitched to the riser.

In various embodiments, the ring body and the first pin are monolithic. In various embodiments, the ring body and the first pin are removably coupled to one another. In various embodiments, the first release ring is configured with a J-shape when viewed in a direction sideways to the top-to-bottom direction of the riser. In various embodiments, the second pin is removable from the side plates to permit installation of the first release ring. In various embodiments, the riser comprises multiple plies, and wherein the first back webbing is stitched to the riser between plies of the riser. In various embodiments, the ring release system further comprises a second release ring coupled to the riser, wherein the first release ring and second release ring are cascadingly rotatable with respect to the riser responsive to release of a retaining mechanism. In various embodiments, at least a portion of the first release ring passes through an aperture of the second release ring due to rotation of the first release ring. In various embodiments, an interior width of at least one of the first release ring and the second release ring is substantially equal to a width of the riser. In various embodiments, the ring release system further comprises a third release ring coupled to the riser, wherein the third release ring is cascadingly rotatable with respect to the riser responsive to rotation of the second release ring. In various embodiments, the ring release system further comprises a third pin, the pair of side plates coupling the first pin, the second pin, and the third pin, wherein the first release ring is coupled to the riser via a second back webbing passing around the third pin and stitched to the riser. In various embodiments, a non-hinged end of the first release ring is bent. In various embodiments, the first pin, the second pin, and a first side plate of the pair of side plates are monolithic. In various embodiments, the first pin and a first side plate of the pair of side plates are monolithic, and the second pin and a second side plate of the pair of side plates are monolithic.

The contents of this summary section are provided only as a simplified introduction to the disclosure and are not intended to be used to limit the scope of the appended claims.

BRIEF DESCRIPTION OF THE DRAWINGS

With reference to the following description, appended claims, and accompanying drawings:

FIG. 2A illustrates a front view of certain components of an improved ring release system in accordance with various exemplary embodiments;

FIG. 23 illustrates a two-pin leveraging ring attachment in accordance with exemplary embodiments;

FIGS. 24 and 25 illustrate three-pin leveraging ring attachments in accordance with exemplary embodiments;

FIG. 26 illustrates a section view of certain components of an improved ring release system in accordance with exemplary embodiments;

FIG. 27 illustrates a section view of certain components of an improved ring release system with a release ring having a curved end in accordance with exemplary embodiments;

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for release systems, parachute construction, deployment, reefing, disreefing, release, recovery, and/or the like may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical ring release system and/or related methods of use.

Principles of the present disclosure may be compatible with and/or may be utilized in connection with principles disclosed in U.S. Pat. No. 9,676,487 entitled "RING RELEASE SYSTEMS AND METHODS" and U.S. Pat. No. 9,789,968 entitled "RING RELEASE SYSTEMS AND METHODS", each to Fox. The disclosures of all the foregoing patents are incorporated herein by reference in their entireties, including but not limited to those portions that specifically appear hereinafter, but except for any subject matter disclaimers or disavowals, and except to the extent that the incorporated material is inconsistent with the express disclosure herein, in which case the language in this disclosure shall control.

Figure 1:
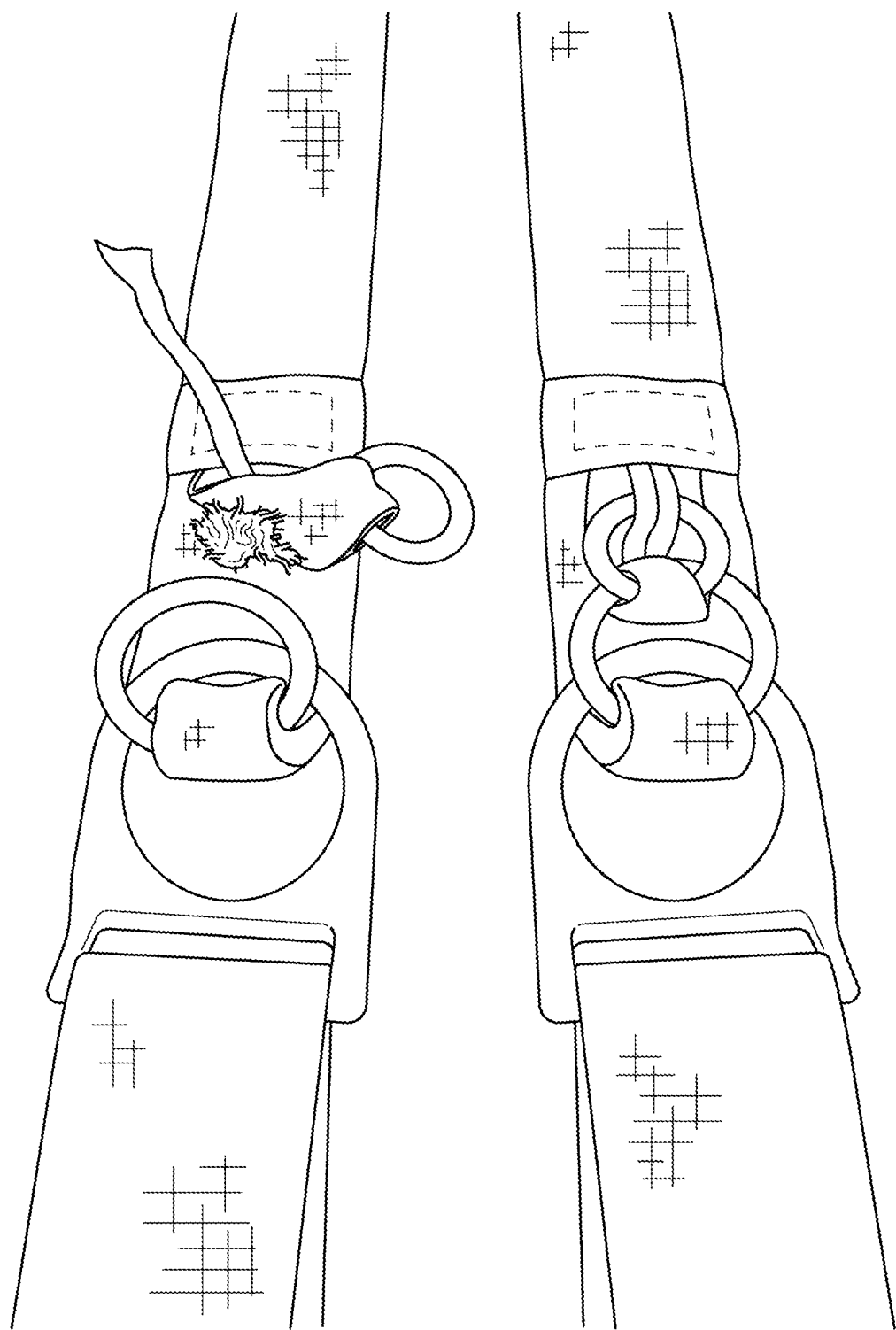
FIG. 1 illustrates a damaged prior art ring release system.
Figure 2B:
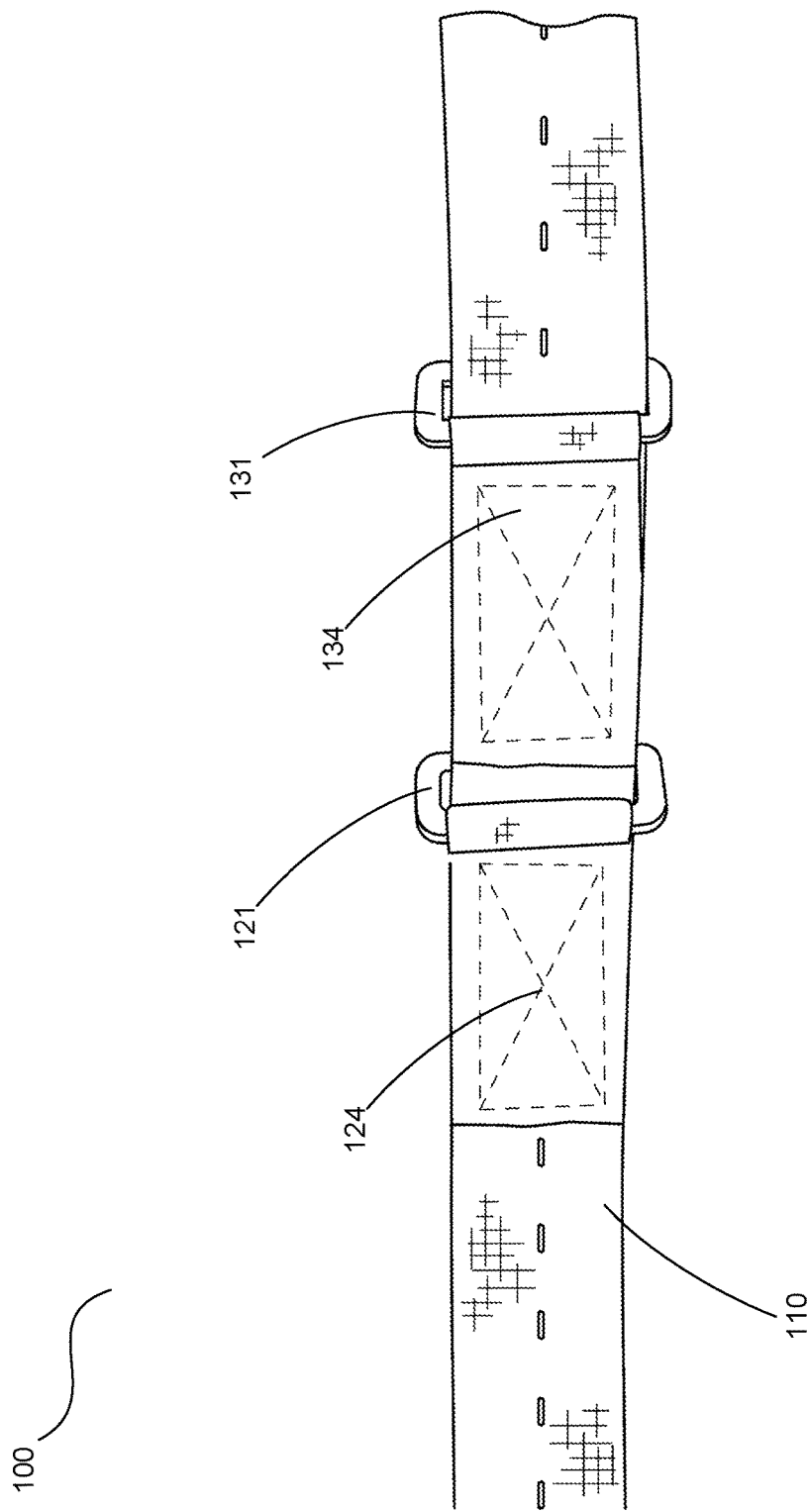
FIG. 2B illustrates a rear view of certain components of an improved ring release system in accordance with various exemplary embodiments.
Figure 3:
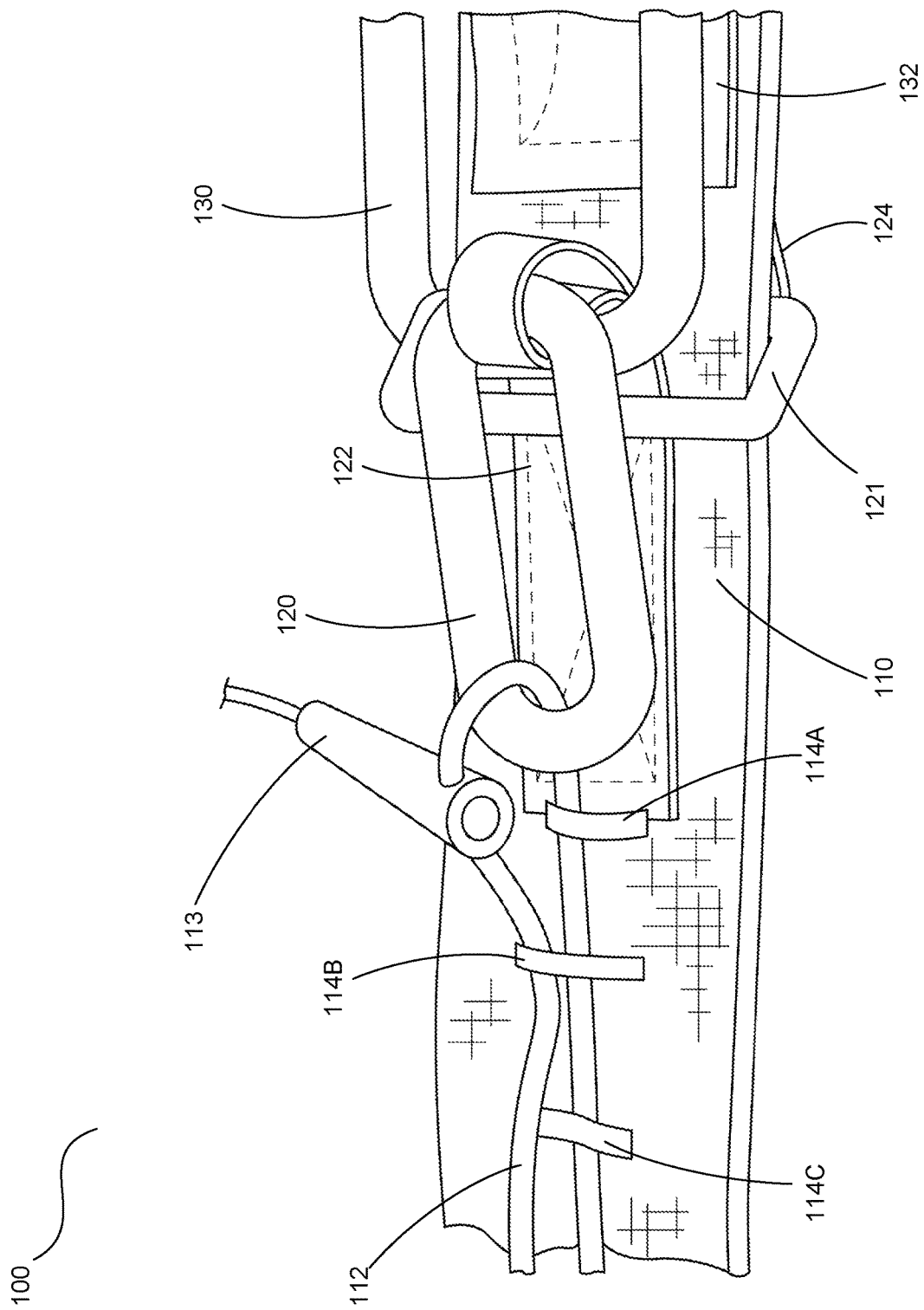
FIG. 3 illustrates certain components of an improved ring release system in a secured configuration in accordance with various exemplary embodiments.
Figure 4:
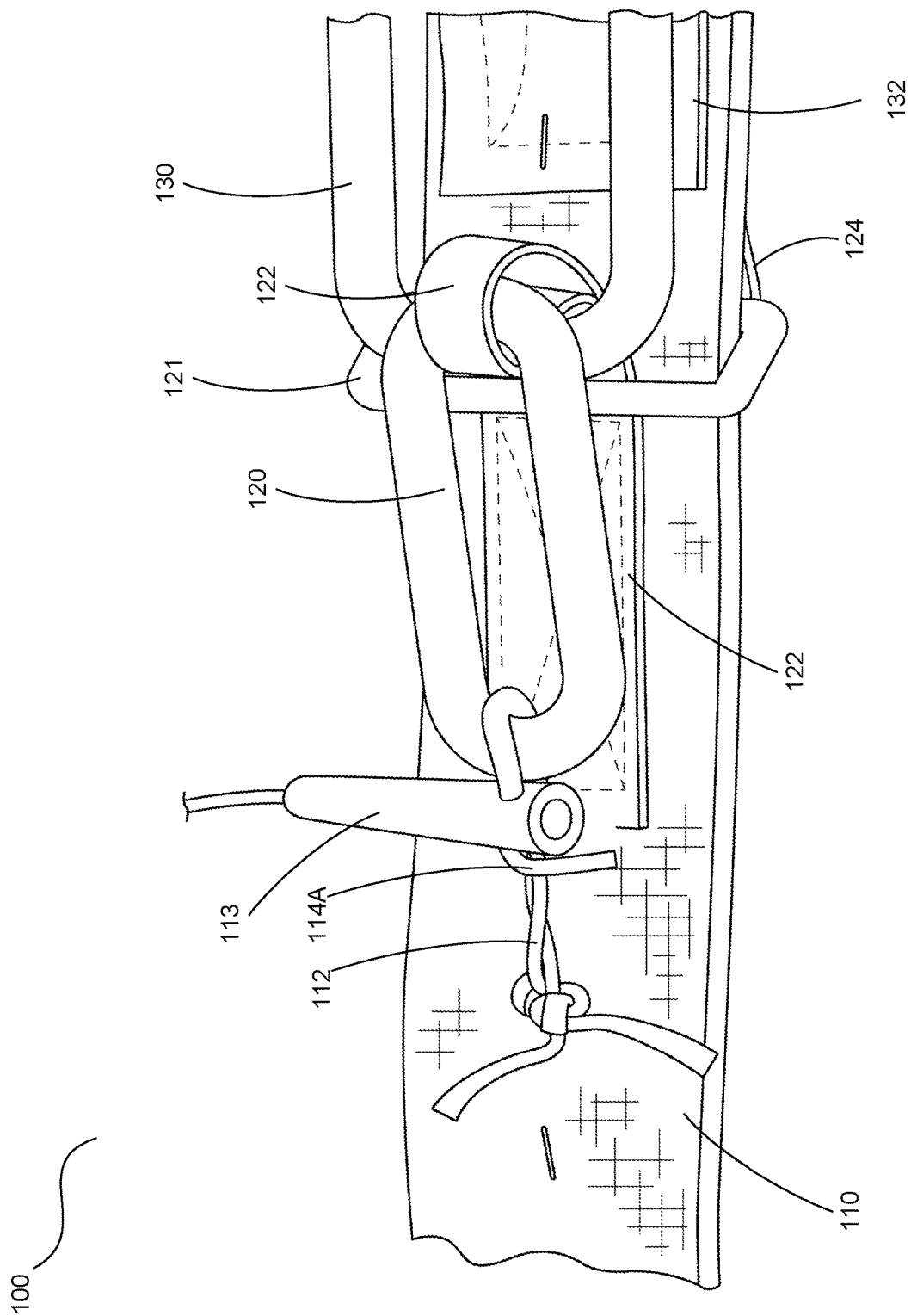
FIG. 4 illustrates certain components of an improved ring release system in a secured configuration in accordance with various exemplary embodiments.
Figure 5:
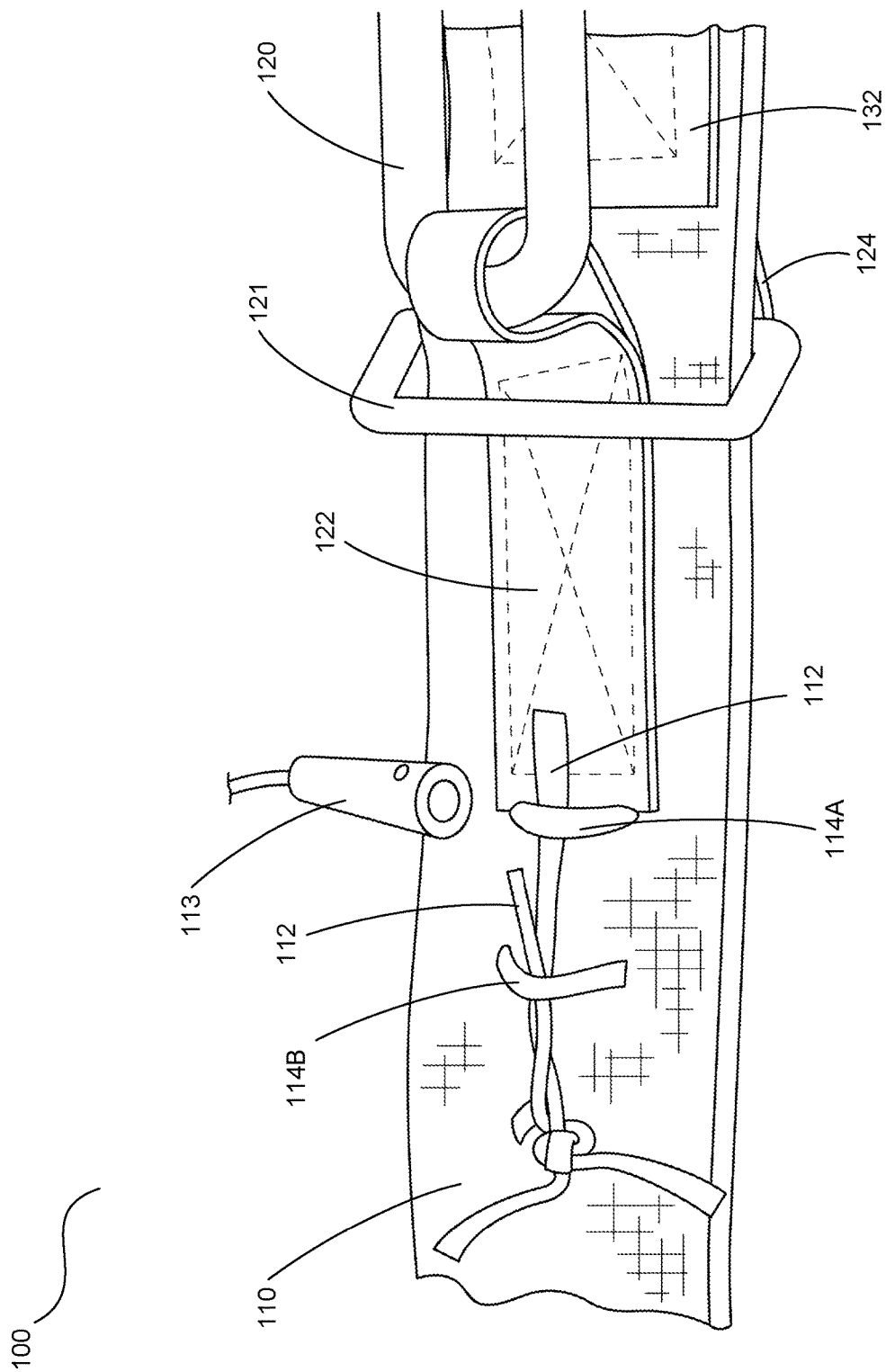
FIG. 5 illustrates certain components of an improved ring release system in a released configuration in accordance with various exemplary embodiments.

In U.S. Pat. No. 9,789,968 to Fox it is disclosed that the conventional method of attaching rings to the base webbing for a ring release device can allow the attachment stitching to be put in peel, especially if the ring release device is subjected to high tension forces. Depicted on the left side of FIG. 1 is an example of such peeled stitching in a prior art ring release device. In U.S. Pat. No. 9,789,968 it is also disclosed that a peeling force can be converted to a much stronger shearing force by utilizing cords routed through the base webbing and then sewn to the back side as a means to secure rings to the base webbing. However, it can be quite difficult to neatly route the cords, which typically have a relatively large diameter, through the base webbing if the base webbing has a tight weave. Therefore, improved attachment methods and approaches have been developed as disclosed herein.

Figure 6:
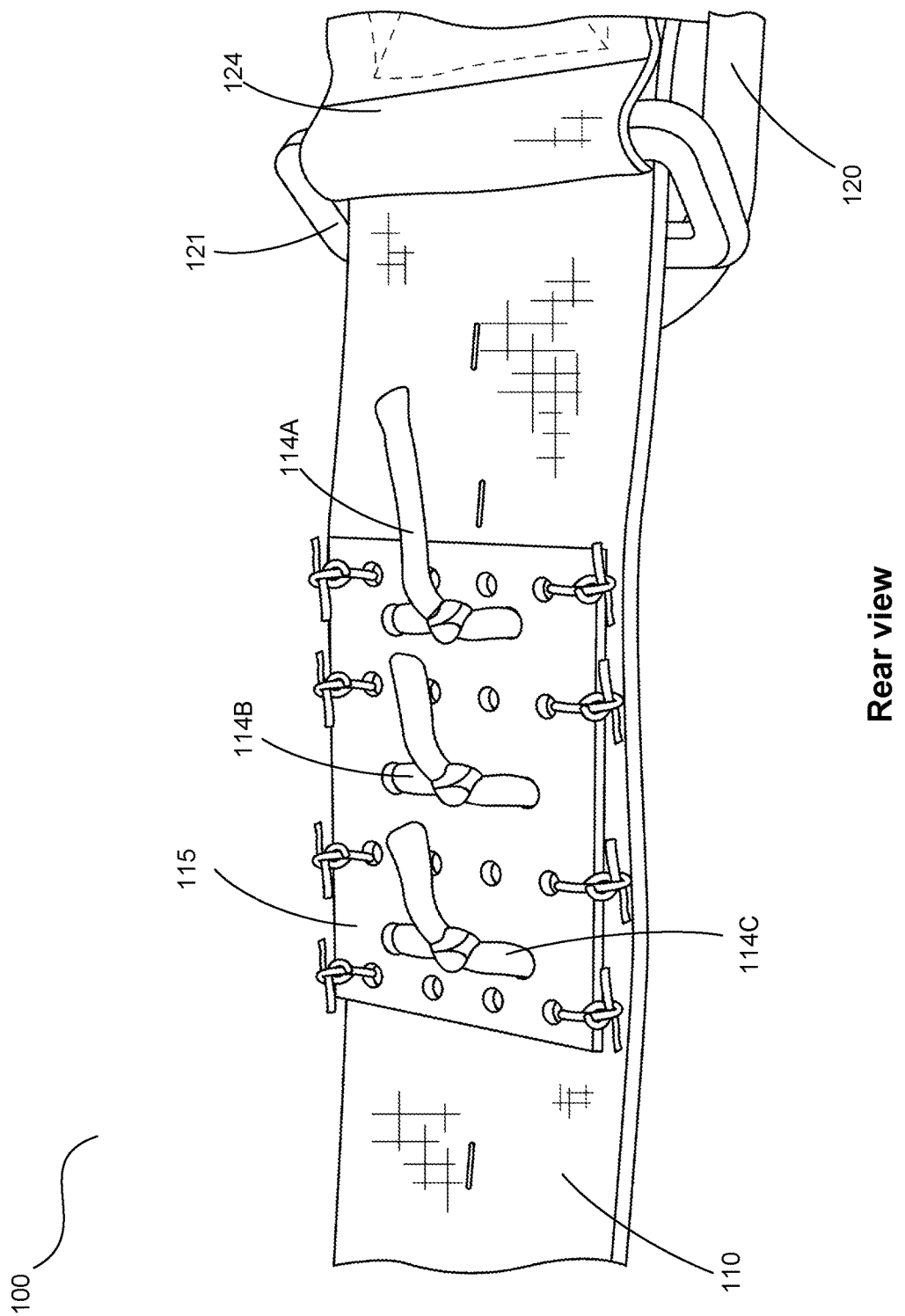
FIG. 6 illustrates a rear view of certain components of an improved ring release system in accordance with various exemplary embodiments.
Figure 7:
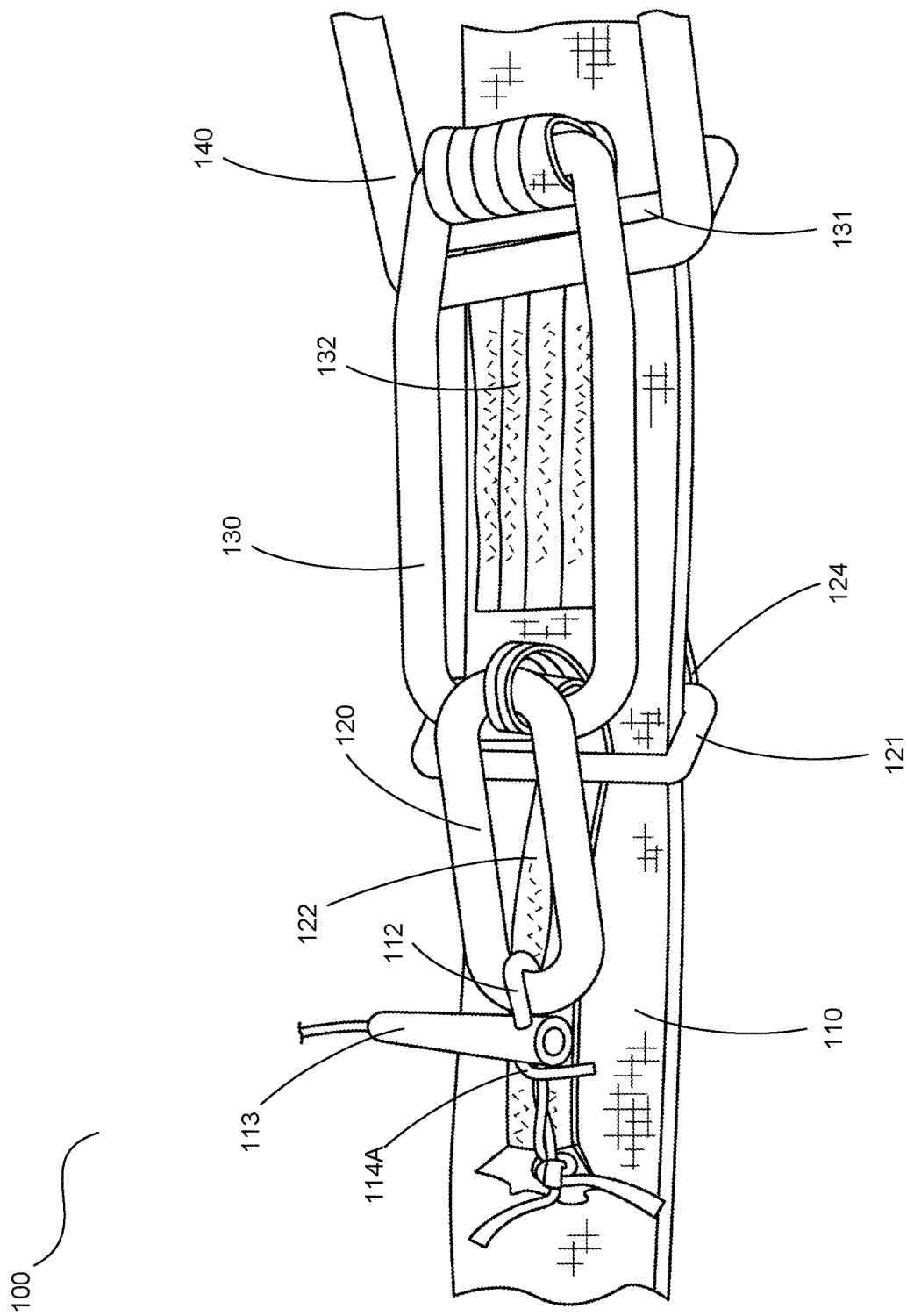
FIG. 7 illustrates certain components of an improved ring release system in a secured configuration in accordance with various exemplary embodiments.
Figure 8:
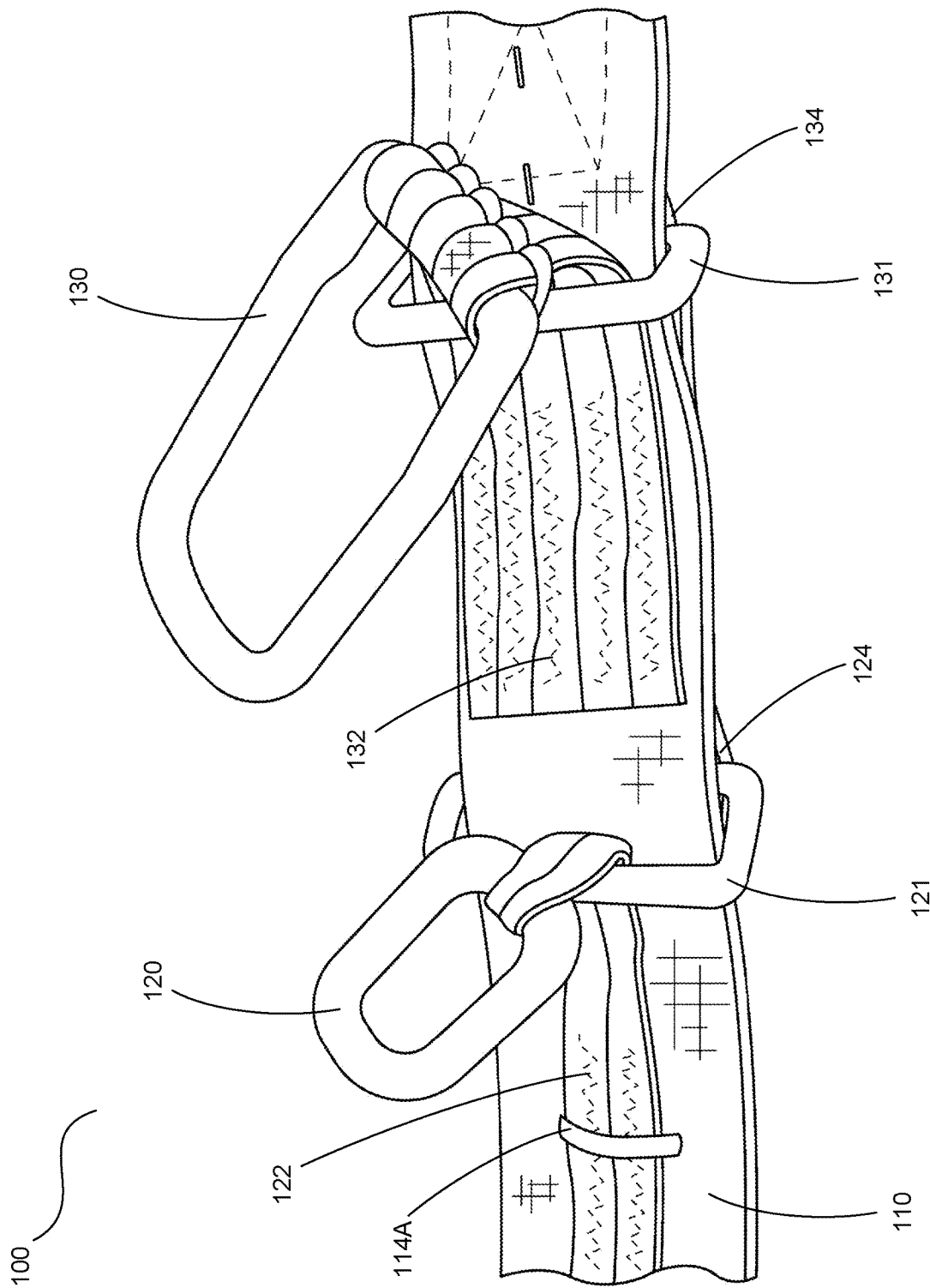
FIG. 8 illustrates certain components of an improved ring release system in a released configuration in accordance with various exemplary embodiments.
Figure 9:
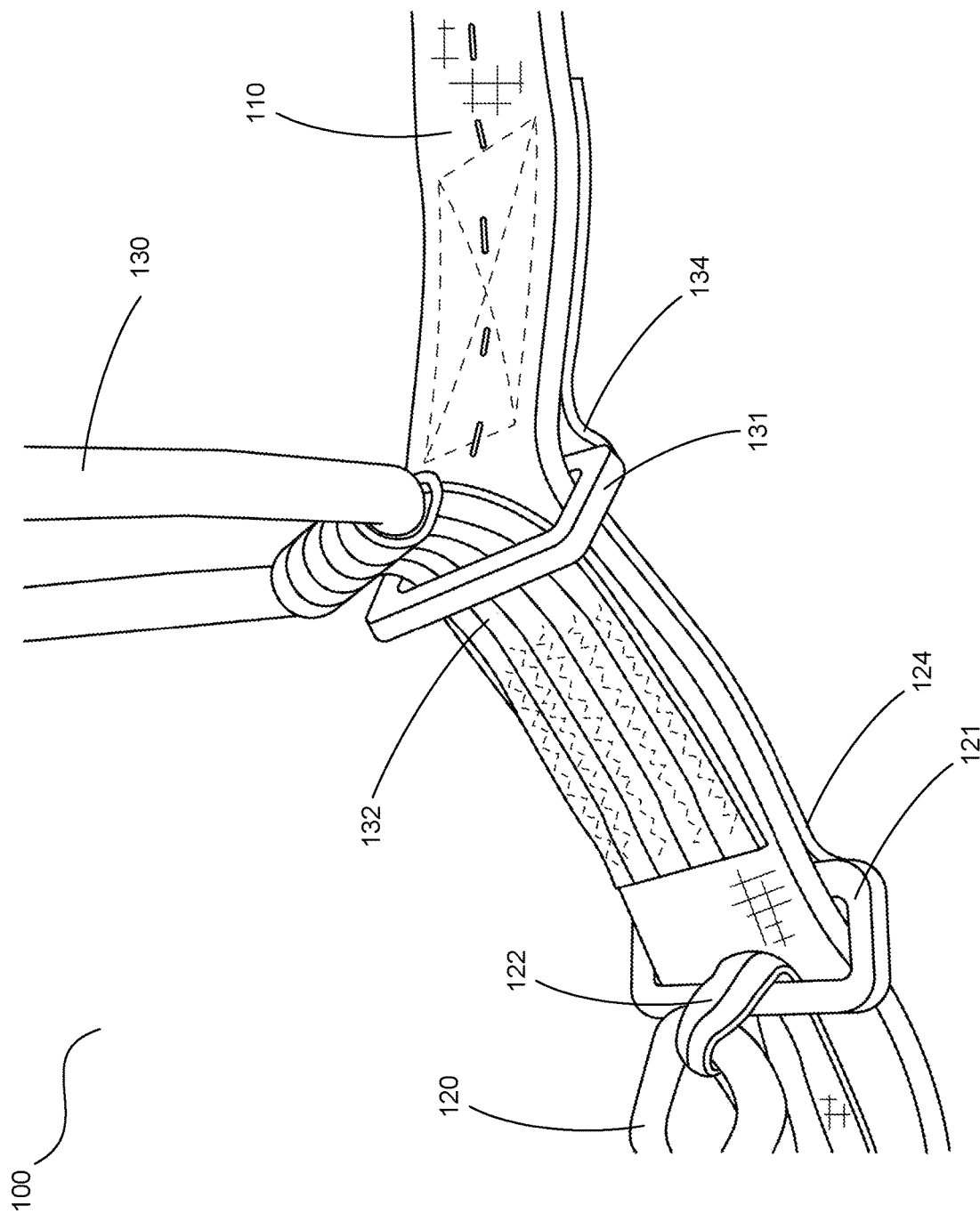
FIG. 9 illustrates certain components of an improved ring release system in a released configuration, illustrating stitching remaining in shear in accordance with various exemplary embodiments.

In various exemplary embodiments, with reference to FIGS. 2-10 it can be seen that, in various exemplary ring release systems 100 comprising an upper release ring 120, an intermediate release ring 130, and a lower release ring 140, front webbing (or front cordage) 122/132 may be stitched to the front side of a riser such as base webbing 110 after first being routed through a retaining ring 121/131 that surrounds the base webbing 110. The front stitching can still be placed in peel, however, if the retaining ring 121/131 is allowed to migrate toward the stitching that secures the attachment webbing 122/132 to the front of the base webbing 110. To prevent such migration, another webbing, such as back webbing 124/134 may be attached to the retaining ring 121/131 and sewn to the back side of the base webbing 110 to properly position and affix it. Cordage may be substituted for the front webbing 122/132, for example as illustrated in FIGS. 7, 8, and 9. Similarly, cordage may be substituted for the back webbing 124/134. If a force such as that which caused the sewing failure depicted in FIG. 1 is applied to an improved ring release system 100 disclosed herein, FIG. 9 can be helpful in visualizing that the stitches in both the front sewing (i.e., associated with front webbing 122/132) and back sewing (i.e., associated with back webbing 124/134) would be placed in shear rather than in peel.

Figure 10:
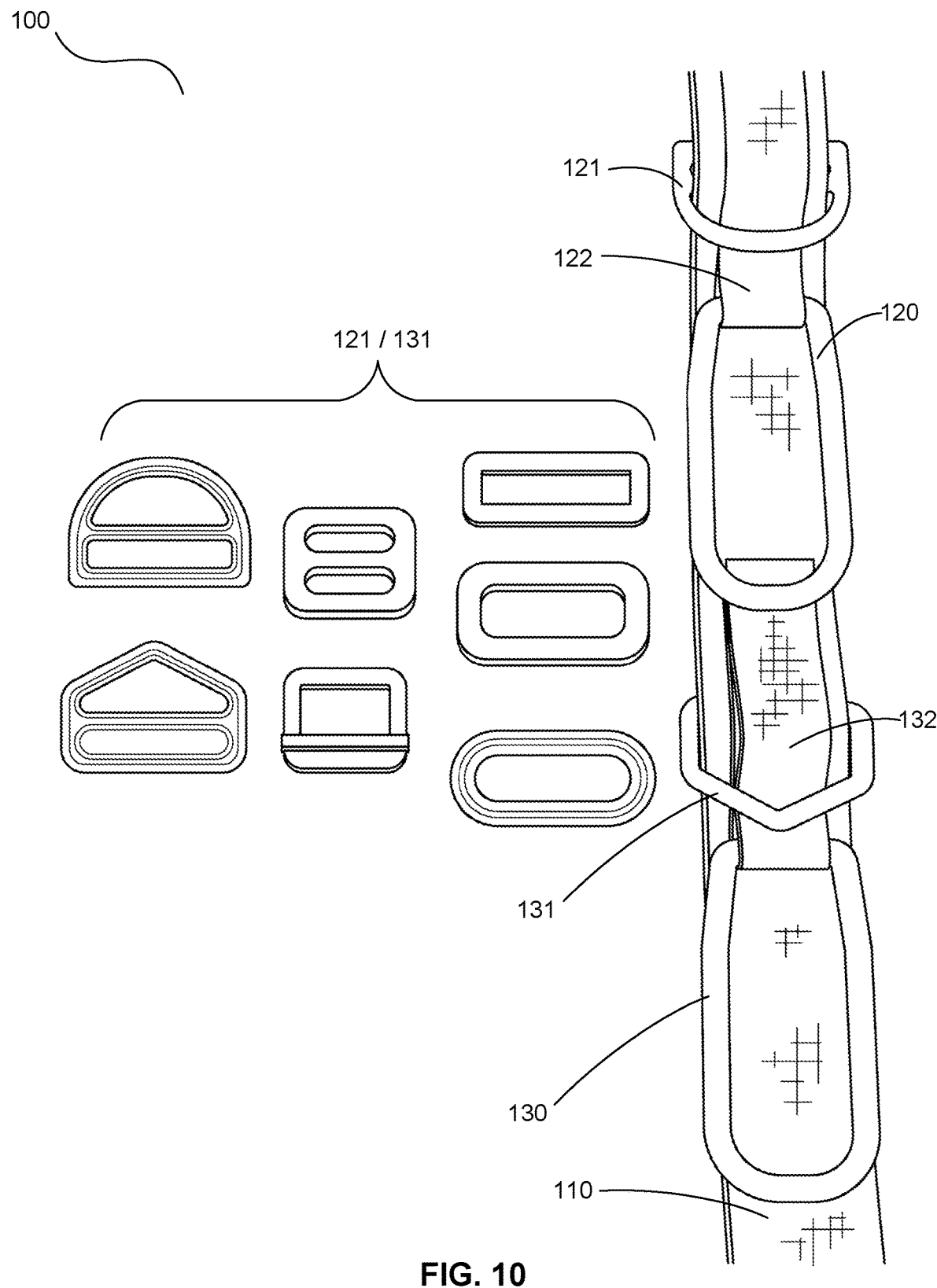
FIG. 10 illustrates exemplary retaining ring configurations of an improved ring release system in accordance with various exemplary embodiments.

Although the retaining ring 121/131 used to illustrate exemplary improved attachment methods is shown in certain Figures as rectangular, other ring shapes, such as v-rings or d-rings may be utilized. FIG. 10 illustrates various exemplary configurations of retaining ring(s) 121/131 that may be utilized. Generally, the configuration of retaining ring(s) 121/131 will be influenced by the width and/or thickness of the base webbing 110.

In addition to the foregoing improvements, principles of the present disclosure contemplate additional improvements for ring release systems. For example, in U.S. Pat. No. 9,676,487 to Fox, an exemplary locking-cord for the topmost ring is routed under a metallic keeper to hold the locking-cord somewhat close to the front of the base webbing. In contrast, as disclosed herein as part of an improved ring release system 100 and associated methods, a release mechanism such as locking cord 112 is held much closer to the base webbing 110 by cordage keeper-loops 114 (for example, cordage keeper-loops 114A, 114B, and 114C) that have been routed through the base webbing 110. Although some embodiments may utilize as few as two keeper-loops 114, three keeper-loops 114 provide a better solution. In an exemplary embodiment, keeper-loop 114A, which is closest to front webbing 122 in FIGS. 2-5, helps to hold the topmost release ring 120 close to the front of the base webbing 110 when system 100 is in a secured (i.e., pre-release) position. Also, more importantly, keeper-loop 114A prevents the topmost ring 120 from being drawn so far toward the locking cord 112 anchor point that the relatively weak locking cord 112 and associated keeper-loop(s) 114 could be forced to share tension forces that should be borne entirely by the enormously stronger base webbing 110. The center keeper-loop 114B primarily serves to hold the locking cord 112 close to the base webbing 110, but it can also function to properly position and stabilize a retaining mechanism, such as release cutter 113 when such a cutter is part of the assembly, which is the majority of the instances when an exemplary ring release system 100 is used. Although keeper-loop 114C is superiorly used to provide an anchor point for locking cord 112 and to prevent a locking cord 112 knot from cluttering a region where release cutter 113 is located, in some embodiments keeper-loop 114C may be eliminated and the locking cord 112 may be secured to keeper-loop 114B. To properly position the keeper-loops 114A, 114B, and/or 114C and prevent them from migrating, they can be routed through a rigid plate 115 that is affixed to the back of the base webbing 110 as illustrated in FIG. 6.

In various embodiments, particularly with 3-ring releases, release ring 140 is attached to a parachute harness and release rings 120, 130 are attached to a releasable portion of the parachute assembly which is releasable from release ring 140. In this regard, release rings 120, 130 may be released from release ring 140 when release cutter 113 is activated. Release ring 120 and release ring 130 may be cascadingly rotatable with respect to the base webbing 110 responsive to release of a retaining mechanism, such as release cutter 113.

Figure 11:
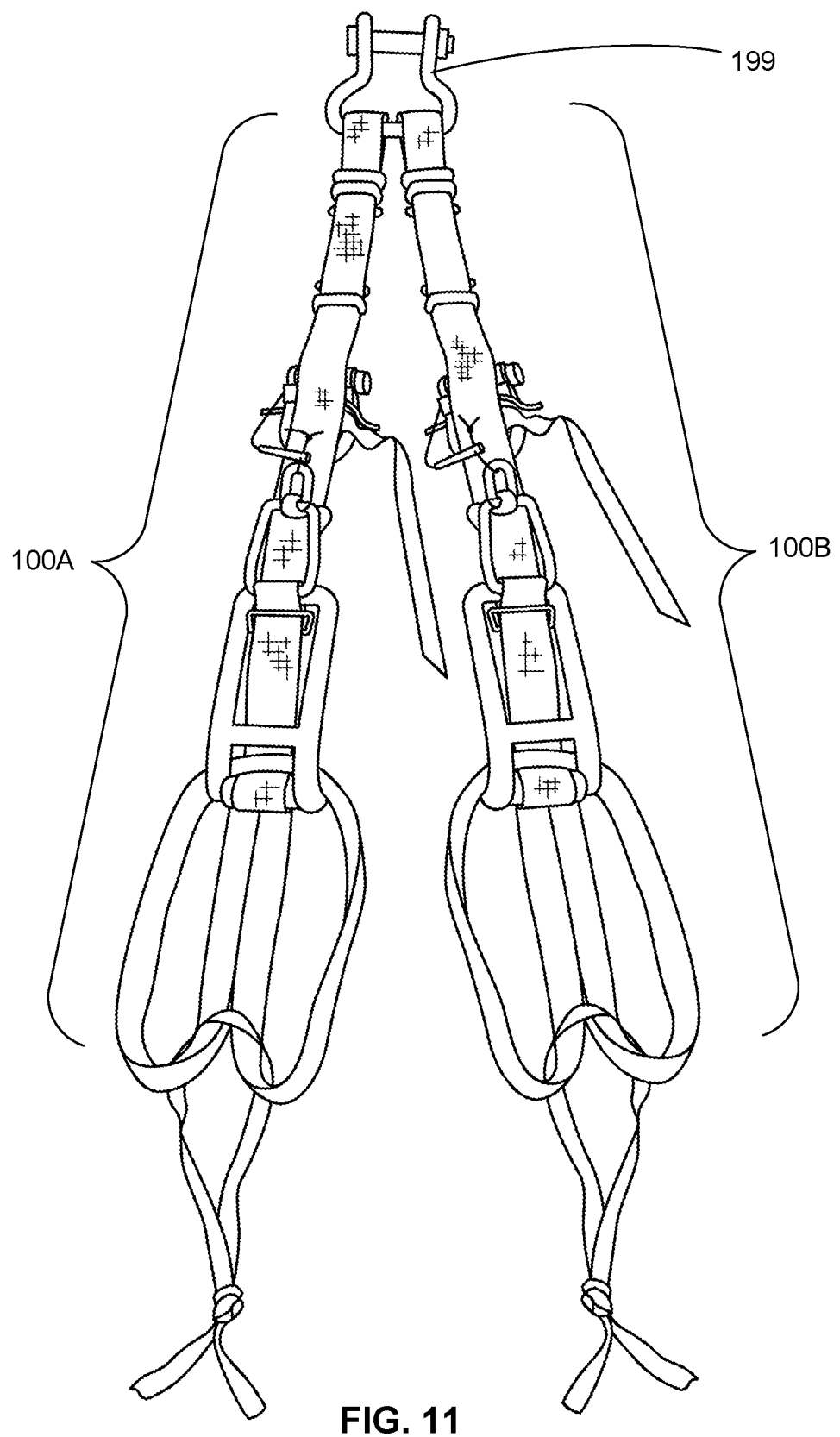
FIG. 11 illustrates a dual ring release system in accordance with an exemplary embodiment.

Turning now to FIG. 11, in various exemplary embodiments an exemplary ring release system 100 may be utilized in a dual or paired configuration, for example in order to increase a weight capacity of an overall system. In some dual configurations, a first ring release system 100A and a second ring release system 100B may be coupled to a common shackle or clevis 199 (for example, as illustrated). Moreover, in some dual configurations a stabilizing plate (not pictured) may be added which is coupled to the first ring release system 100A and to the second ring release system 100B, for example at a location near the upper portion of the base webbing 110 for each system. The stabilizing plate may be operative to ensure that the release cutters 113 of each respective ring release system 100 do not incur undesired contact with each other (or with other components of either ring release system 100) during the somewhat chaotic conditions that occur during aerial deployment and prior to activation of the release cutters 113. Additionally, a stabilizing plate may be utilized as a mounting or placement location for a release cutter initiation unit. Moreover, although a dual system is illustrated in FIG. 11, it will be appreciated that one system 100, three systems 100, four systems 100, and/or any suitable number of systems 100 may be utilized in connection with a desired size of an overall system, weight capability of an overall system, and/or the like.

Figure 12:
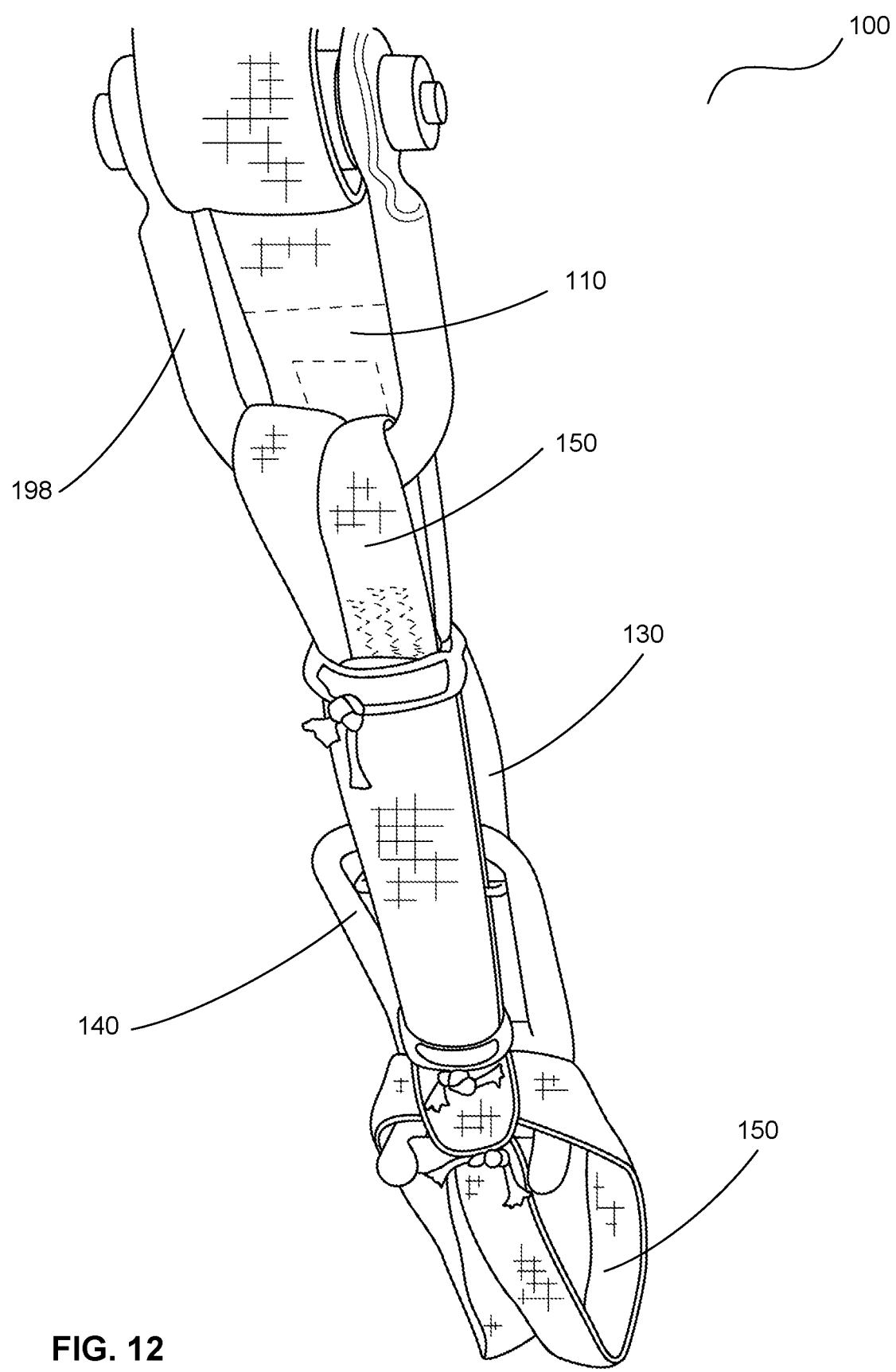
FIGS. 12 and 13 illustrate a replaceable flexible extension component of a ring release system in accordance with an exemplary embodiment.
Figure 13:
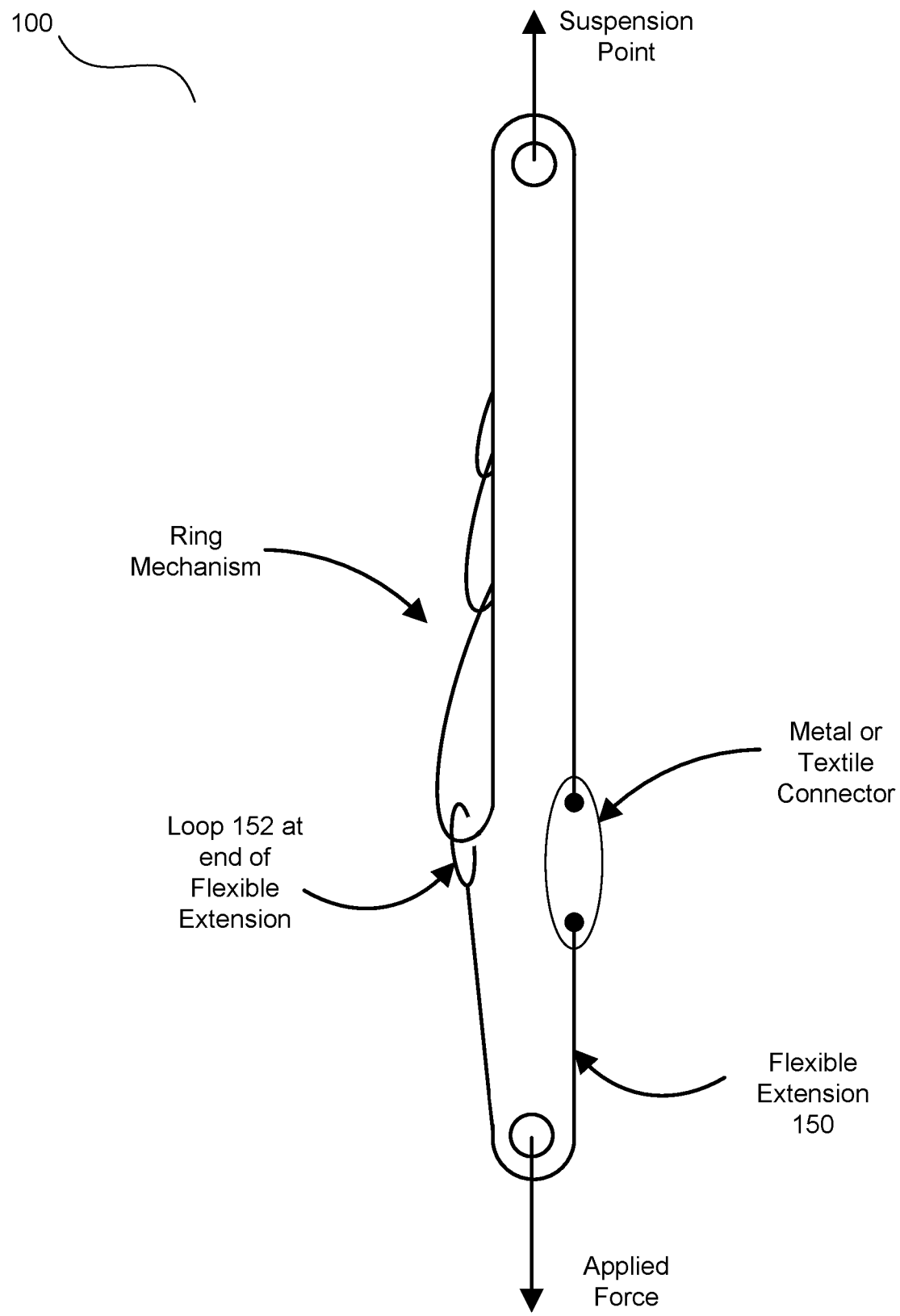

Turning now to FIGS. 12 and 13, in some exemplary embodiments components of an improved ring release system 100 may be configured to be modular, serviceable, and/or replaceable. For example, flexible extension 150 depicted in U.S. Pat. No. 9,676,487 is illustrated therein as being sewn to the back side of the primary webbing. However, flexible extension 150 (and/or corresponding loop 152 at the end thereof) are potentially exposed to significant friction induced abrasion because they slide off lower release ring 140, a J-ring, under a potentially large tension force. Because of the likelihood for abrasion damage to flexible extension 150 and/or loop 152, in various exemplary embodiments disclosed herein these components (or similar components) of a ring release system 100 may be configured as easily replaceable elements, for example as is depicted in FIG. 13. For example, when needed, a metal or textile connector may be utilized to remove a worn or damaged flexible extension 150 and to install a replacement. In FIG. 12, flexible extension 150 is shown attached to the primary structure with a steel clevis/shackle 198, thus enabling replacement of this component as needed. However, any suitable coupling and/or replacement components may be utilized, as desired.

Returning momentarily to FIG. 2A and FIG. 2B, in various exemplary embodiments a ring release system 100 utilizes retaining rings 121/131 which are secured by back webbing 124/134 to prevent front webbing 122/132 from being loaded in peel. Because retaining rings 121/131 surround both base webbing 110 primary webbing and the webbing comprising front webbing 122/132, respectively, loads from release rings 130/140 cannot pry release rings 120/130 away from the face of base webbing 110 and, as a result, front webbing 122/132 cannot be placed in peel. Moreover, the stitching for back webbing 124/134 can only be loaded in shear when ring release system 100 is used as designed. However, additional improvements and/or modifications may be made to ring release system 100, for example in order to facilitate improved manufacture and/or assembly of ring release system 100.

In various exemplary embodiments where release rings 120, 130, 140 are each 1-piece (i.e., monolithic), when constructing ring release system 100, release rings 120, 130, 140 must be positioned before the stitching begins. In these embodiments, maintaining proper length dimensions for the assembly can be difficult because the presence of release rings 120, 130, and/or 140 can interfere with accurate sewing processes. To overcome this sewing interference issue, in various exemplary embodiments ring release system 100 may utilize rings comprised of multiple parts, which allows the rings to be installed after the sewing has been completed.

With reference now to FIGS. 14A through 22, in various exemplary embodiments rings of ring release system 100 may be curved, arched, and/or otherwise non-planar. Moreover, rings of ring release system 100 may comprise removable or replaceable pin(s), for example in order to facilitate installation and/or replacement of rings.

Figure 16:
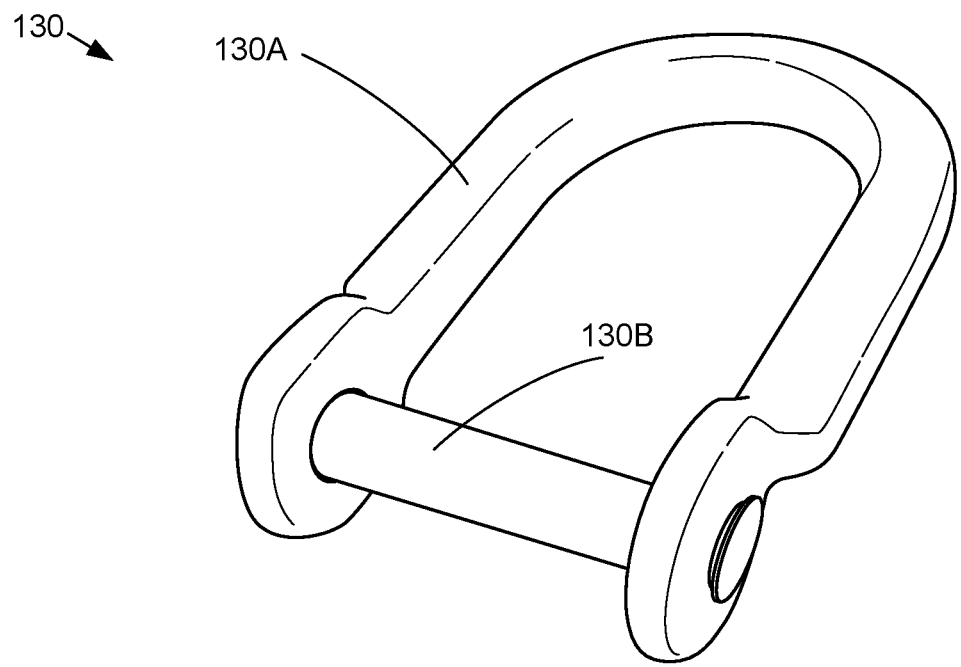
FIG. 16 illustrates a retaining ring comprising a generally planar ring body and a removable pin, in accordance with various exemplary embodiments.
Figure 18:
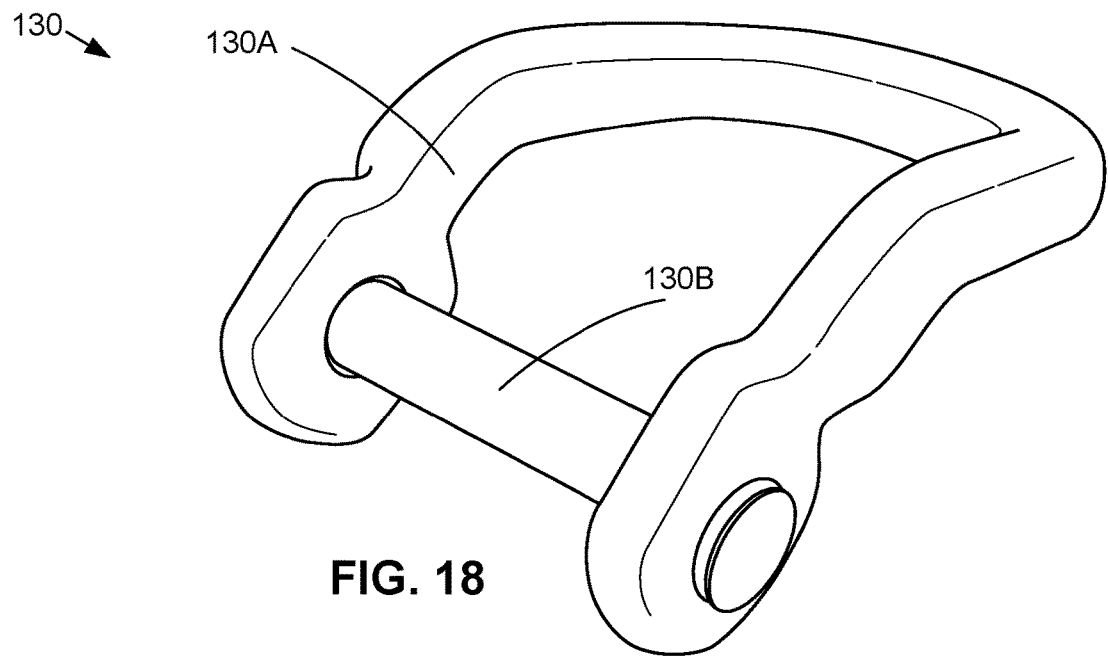
FIG. 18 illustrates a retaining ring comprising a generally non-planar ring body and a removable pin, in accordance with various exemplary embodiments.

With reference now to FIGS. 16 and 18, in an exemplary embodiment a ring of ring release system 100, such as release ring 130, may comprise a ring body 130A and a removable pin 130B. Ring body 130A may comprise a generally horseshoe or U-shape and may be planar or arced/curved in side profile. In this regard, ring body 130A may extend from pin 130B away from base webbing 110 and bend back towards base webbing 110. Pin 130B couples to ring body 130A via a pair of apertures disposed in ring body 130A (for example, disposed generally at the terminal ends of a "U" shape). Pin 130B may be coupled to ring body 130A via any suitable components or techniques, for example via threads, bolts, washers, cotter pins, and/or the like. In an exemplary embodiment, pin 130B is a threaded bolt. Pin 130B may be monolithic; moreover, pin 130B may comprise multiple elements, for example two elements each having a terminal flange, with the two elements threadable one inside the other telescopically to form pin 130B and couple to ring body 130A. Ring body 130A and pin 130B may comprise the same material, for example a durable metal alloy such as steel; however, ring body 130A and pin 130B may comprise different materials and/or alloys based on the desired strength and capability of ring release system 100. In various embodiments, ring body 130A and pin 130B may be made from other materials such as a composite material and/or a plastic material. It will be appreciated that other rings of ring release system 100, such as release ring 130, may be configured in a similar manner.

Figure 15A:
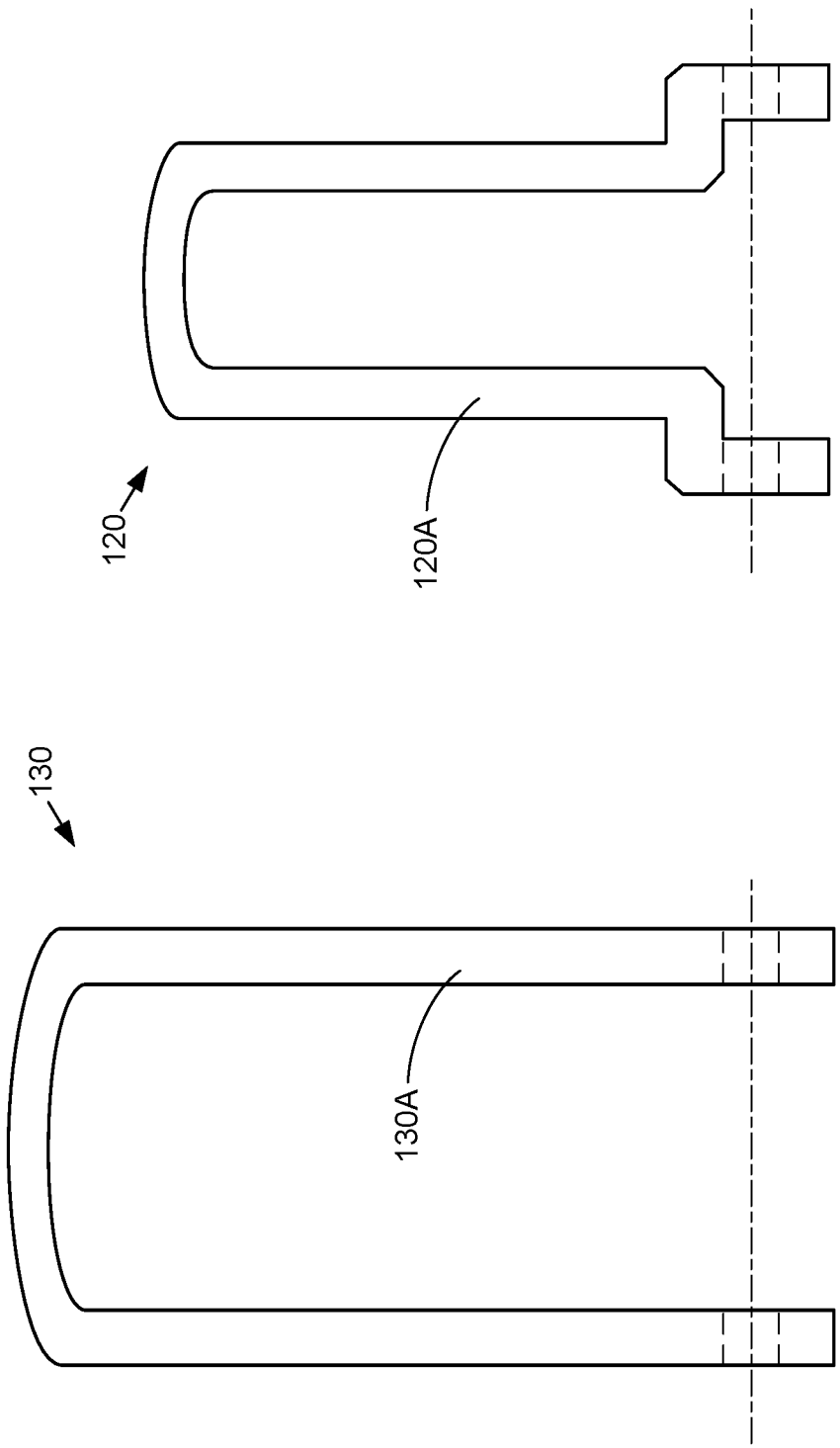
FIG. 15A illustrates ring components having an aperture therethrough for placement of a pin, in accordance with various exemplary embodiments.

With reference now to FIG. 15A, in various exemplary embodiments the base end interior dimension of release rings 120, 130 may be generally equal to a width of base webbing 110. However, the base end interior dimension may be any suitable width, as desired.

Figure 15B:
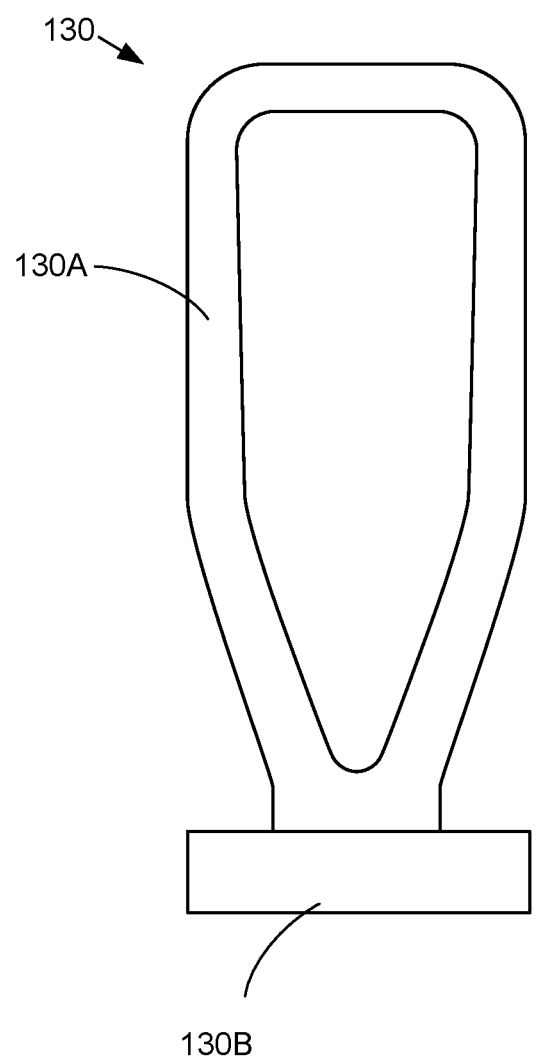
FIG. 15B illustrates ring components having an integral pin in accordance with various exemplary embodiments.
Figure 17:
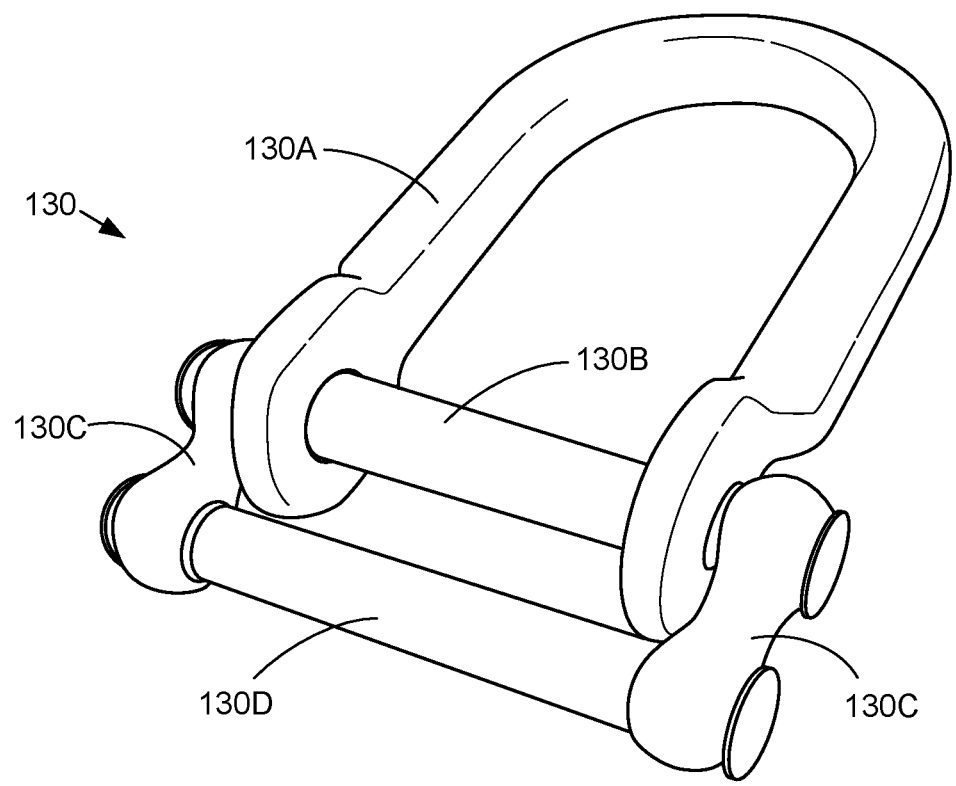
FIG. 17 illustrates a retaining ring comprising a generally planar ring body, a first pin, a hinge, and a second removable pin, in accordance with various exemplary embodiments.
Figure 19:
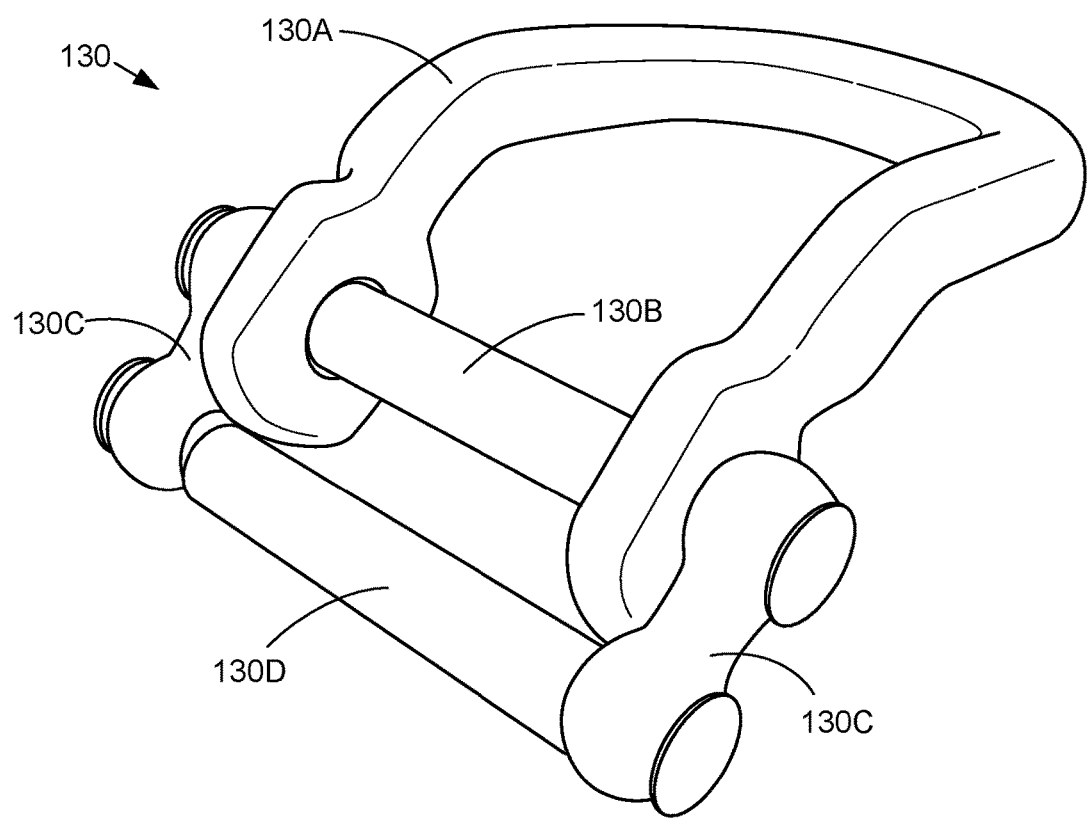
FIG. 19 illustrates a retaining ring comprising a generally non-planar ring body, a first pin, a hinge, and a second removable pin, in accordance with various exemplary embodiments.
Figure 20:
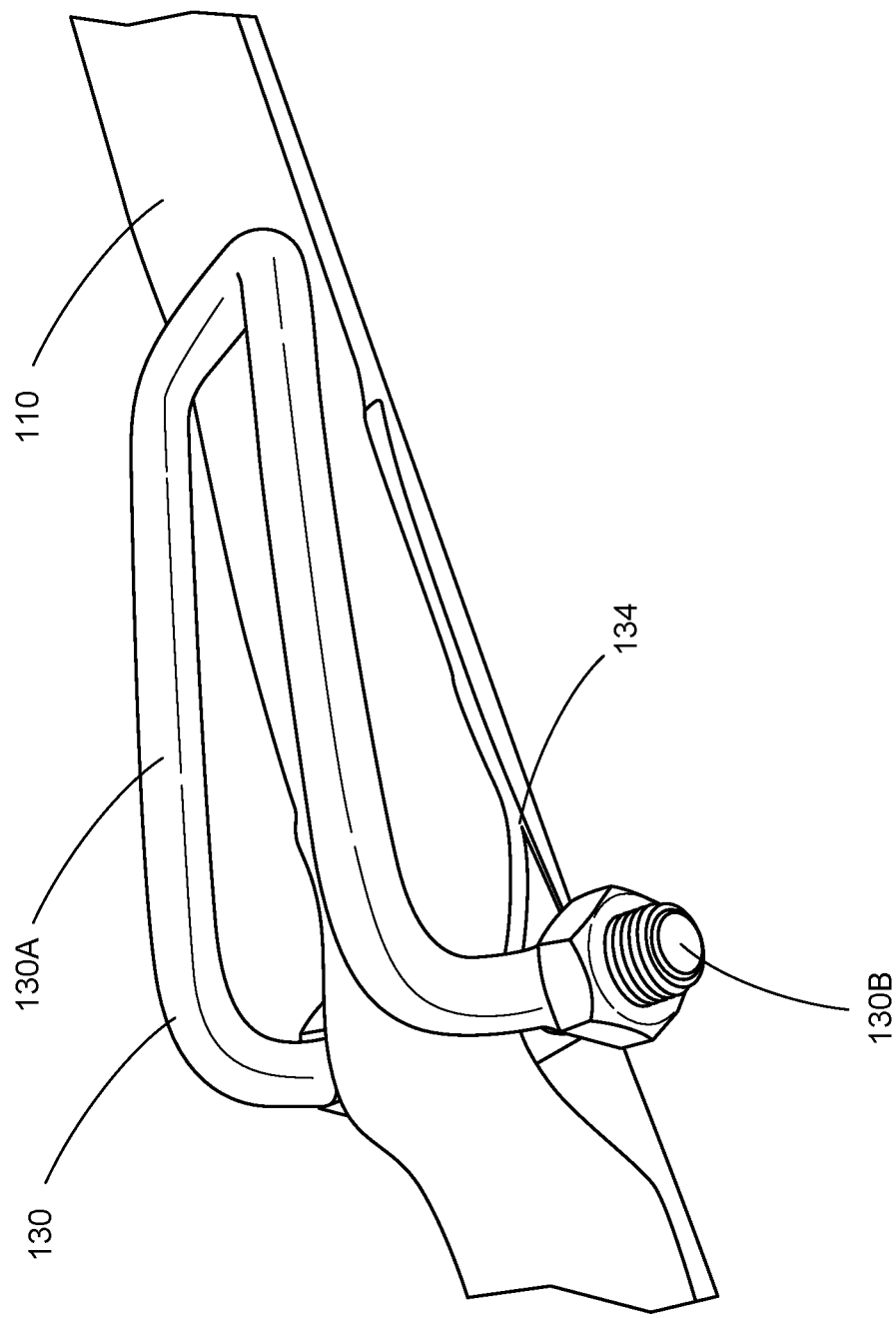
FIG. 20 illustrates various components of an improved ring release system having a ring with a single removable pin in accordance with exemplary embodiments.
Figure 21:
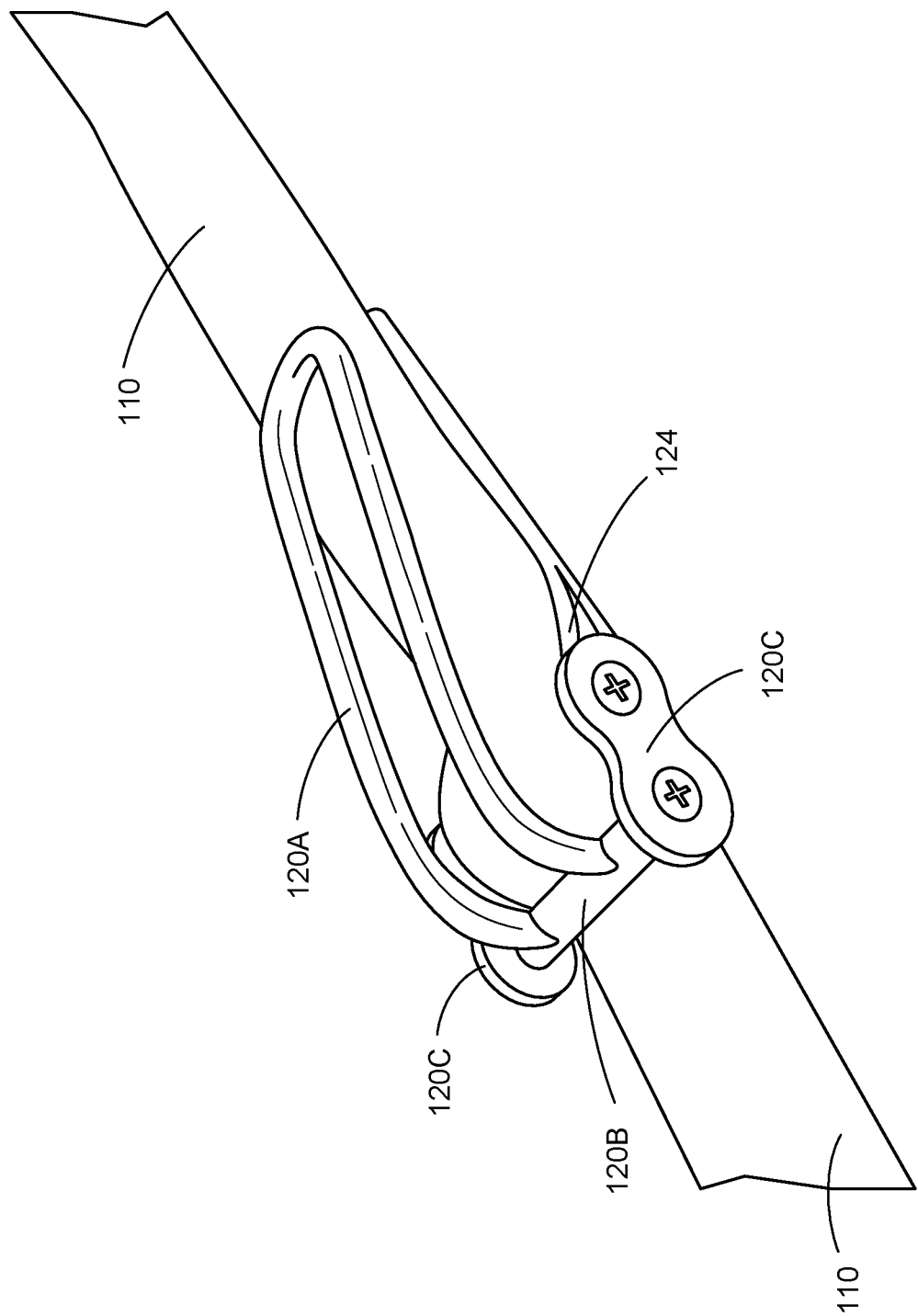
FIG. 21 illustrates various components of an improved ring release system having a ring with two pins in accordance with exemplary embodiments.

With reference to FIGS. 17 and 19, in some exemplary embodiments a ring of ring release system 100, such as release ring 130, may comprise a ring body 130A, a first pin 130B, a pair of side plates 130C, and a second removable pin 130D. Pin 130B may be removable, for example as illustrated in FIGS. 17, 19, and 20; moreover, pin 130B may be integral with ring body 130A, for example as illustrated in FIGS. 15B and 21. It will be appreciated that other rings of ring release system 100, such as release ring 120, may be configured in a similar manner. In particular, FIG. 20 illustrates a ring of ring release system 100, such as release ring 130, comprising a ring body 130A and a pin 130B. However, it will be appreciated that while FIGS. 15B, 16, 17, 18, 19, and 20 are described with respect to release ring 130, release ring 120 may be similarly designed. Similarly, it will be appreciated that while FIG. 21 is described with respect to release ring 120, release ring 130 may be similarly designed. However, it will be understood that in various embodiments ring body 120A of release ring 120 (e.g., see FIG. 21) will generally be designed with a smaller width than ring body 130A of release ring 130 (e.g., see FIG. 20) such that at least a portion of ring body 120A is positioned inside ring body 130A when in a secured position (e.g., see FIG. 26 and FIG. 27). In an exemplary embodiment, an interior width of ring body 130A is generally equal to the width of base webbing 110 and an exterior width of ring body 120A is generally equal to or slightly less than the width of the base webbing 110.

In these exemplary embodiments, side plates 130C and second removable pin 130D may function as a replacement for retaining ring 121. Consequently, in these exemplary embodiments, front webbing 122 may be eliminated. Moreover, this exemplary configuration allows back webbing 124 to be secured to the rear surface of base webbing 110 or between plies of base webbing 110 where it cannot be loaded in peel under normal operating conditions. Similar concepts may be applied to release ring 130.

Figure 22A:
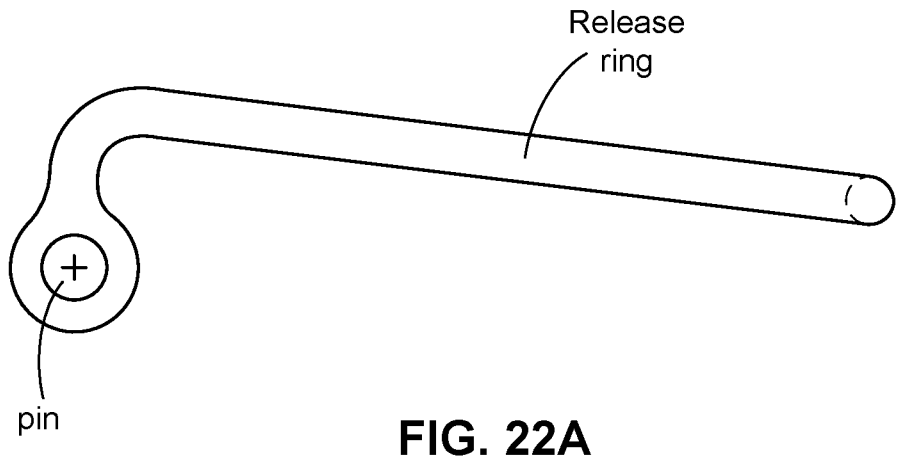
FIGS. 22A and 22B illustrate loading of various components of an improved ring release system in accordance with exemplary embodiments.
Figure 22B:
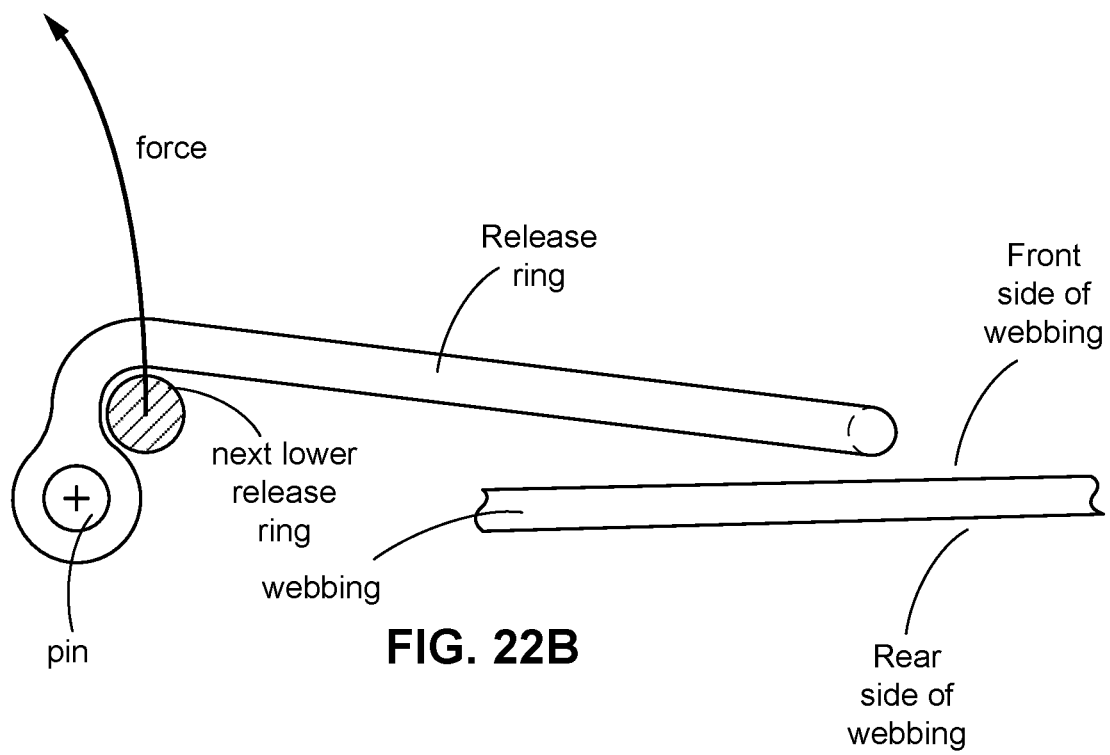

With reference now to FIG. 22A, in various exemplary embodiments, a ring of ring release system 100, such as release ring 120, release ring 130, and/or the like, may be configured with a somewhat J-shape in side view, and may comprise a generally U-shaped ring body 120A having apertures at the lower end through which a pin, such as pin 120B, can be installed. In operation of ring release system 100, only the lower-most ring, such as release ring 140, is exposed to direct loads generated by a coupled payload; however, it is contemplated herein that under some circumstances, for example when elastic webbing such as nylon is used for the primary webbing 110 (i.e., base webbing 110), the upper rings (e.g., release rings 120 or 130) may also be exposed to direct loads. As seen in FIG. 22B, any ring above the lower-most ring is only exposed to somewhat perpendicular loads generated by the upper end of the next lower ring as it exerts force in the direction illustrated by the curved arrow. Typically, the release ring of FIG. 22B (for example, release ring 120) would be attached to the face of the primary webbing (i.e., base webbing 110) by stitching such as depicted by the right side of FIG. 1.

Figure 14A:
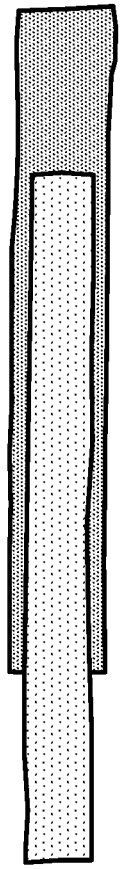
FIG. 14A illustrates stitched webbing components subject to a shear force.
Figure 14B:
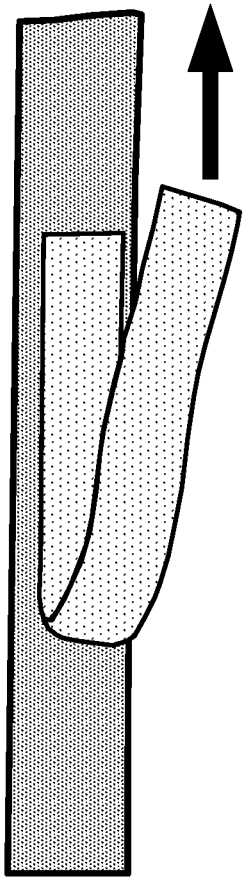
FIG. 14B illustrates stitched webbing components subject to a peeling force.

Under excessive loading conditions, per FIG. 22B, the stitching that secures a ring attachment webbing (for example, webbing 122) to the face of the primary webbing (base webbing 110) can become overloaded and fail, allowing the ring attachment webbing to be peeled from base webbing 110. Such a failure is illustrated on the left side of FIG. 1. By way of reference, FIG. 14A illustrates two components stitched to one another and being loaded in shear; FIG. 14B illustrates two components stitched to one another and being loaded in peel. Shear loading is significantly stronger than peel loading, due to nearly all stitches being loaded at a given time in the shear configuration, while only a few stitches are loaded at any given time in the peel configuration.

In summary, release rings 120, 130 as depicted in FIGS. 14A through 22B can be incorporated into ring release system 100 after the webbing has been sewn and can replace, as a minimum, retaining rings 121/131 and webbing 122/132; release rings 120, 130 will be secured in position by back webbing 124/134. Because, in these exemplary embodiments, release rings 120, 130 can be secured solely by back webbing 124/134, there is no requirement to secure release rings 120, 130 to the face of base webbing 110 and, therefore, the securing stitching cannot become loaded in peel under normal operating conditions.

With reference now to FIG. 23, a 2-pin leveraging ring attachment is illustrated with back webbing 124 on the back side of base webbing 110; however, back webbing 124 may similarly be attached to the opposite side (i.e., the front side) of base webbing 110. The illustrated 2-pin assembly may tend to pivot about pin 120D, as indicated by the curved arrows, which may be undesirable. In this regard, with reference now to FIG. 24 and FIG. 25, the 2-pin attachment may be replaced with a 3-pin leveraging ring attachment, for example as illustrated in FIG. 24 and FIG. 25. The 3-pin leveraging ring attachment may comprise a first pin 120B, a pair of side plates 120C, a second removable pin 120D, and a third removable pin 120E. Two opposing back webbings 124 may be attached to pins 120D, 120E, respectively. In this manner, the tendency for the 3-pin leveraging ring attachment to pivot is significantly reduced (e.g., compared to the 2-pin leveraging ring attachment of FIG. 23) while the primary webbing (e.g., base webbing 110) is relatively rigid due to tension loads. In various embodiments, the two stabilizing pins adjacent to the webbing (i.e., pins 120D, 120E) may be replaced with a single flat plate member that lies flat against base webbing 110. In various embodiments, removeable pins 120B, 120D, 120E may be disposed in a triangular arrangement. In an exemplary embodiment, pin 120B is located between pin 120D and pin 120E (see FIG. 24) and may be arranged in an equilateral triangle geometry, an isosceles triangle geometry, or other suitable geometry. In an exemplary embodiment, pin 120B is located in line with pin 120E (see FIG. 25) and may be arranged in a right triangle geometry.

It will be appreciated that release ring 120 and/or release ring 130 may be configured as a 2-pin leveraging ring attachment as illustrated in FIG. 23. It will be appreciated that release ring 120 and/or release ring 130 may be configured as a 3-pin leveraging ring attachment as illustrated in FIG. 24 and/or FIG. 25.

In various embodiments, it is desirable for the non-hinged end of the leveraging rings to make contact with the face of the webbing assembly (e.g., base webbing 110). With momentary reference to FIG. 26, it can be seen that the non-hinged end of the J-shaped ring (e.g., release ring 130) tends to be prevented from making direct contact with the webbing (e.g., main webbing 110) because the side plates 120C mechanically block the ring from making direct contact. This tends to present two undesirable results. First, the long end of the leveraging release ring 130 is prevented from maximizing its over-center position and, therefore, its mechanical advantage is diminished by some amount. Secondly, the fulcrum for leveraging release ring 120 is moved further from the short end of leveraging ring 120 and closer to the long end (i.e., moved away from the pivot point), also reducing the mechanical advantage of leveraging ring 120. The exact amount of mechanical advantage loss is dependent on both the placement and the diameter of the cross-member. With reference now to FIG. 27, in some exemplary embodiments release ring 130 is provided with a drooped end, thereby addressing both of the aforementioned undesirable issues. Stated differently, the non-hinged end of release ring 130 may bend around side plates 120C towards main webbing 110.

Figure 29:
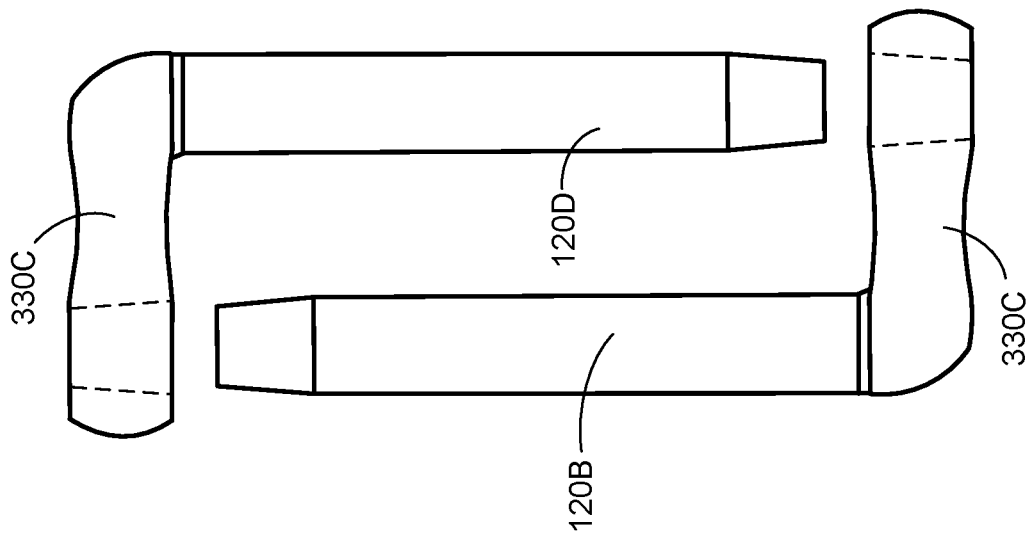
FIG. 29 illustrates a two-pin leveraging ring attachment having an L-shaped configuration in accordance with exemplary embodiments.
Figure 28:
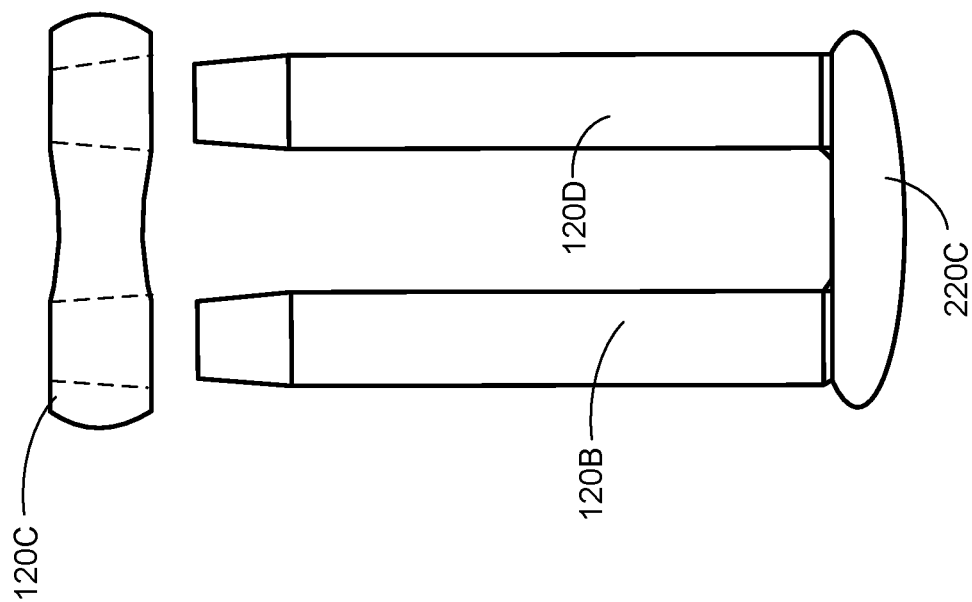
FIG. 28 illustrates a two-pin leveraging ring attachment having a U-shaped configuration in accordance with exemplary embodiments.

In a 2-pin configuration, the leveraging ring attachment has been described as comprising a first removable pin 120B, a pair of side plates 120C, and a second removable pin 120D; however, FIG. 28 illustrates a U-shaped configuration with only one removable side plate 120C. For example, the leveraging ring attachment may comprise first pin 120B and second pin 120D integrally connected (i.e., comprising a single piece) at their ends by side plate 220C and also comprising removable side plate 120C configured to be connected at the opposite end of pins 120B, 120D from side plate 220C. Moreover, FIG. 29 illustrates two L-shaped pins 120B, 120D, with incorporated end plates 330C. The end plate 330C of pin 120B may be configured to receive pin 120D. Likewise, end plate 330C of pin 120D may be configured to receive pin 120B, thereby forming a removable leveraging ring attachment.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

In the foregoing specification, various embodiments have been described. However, one of ordinary skill in the art appreciates that various modifications and changes can be made without departing from the scope of the present disclosure as set forth in the claims below. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A ring release system, comprising:
   a riser comprising webbing, the riser having a top and a bottom;
   a first release ring comprising:

a ring body;
a first pin;
a second pin; and
a pair of side plates coupling the first pin and the second pin;
wherein the first release ring is coupled to the riser via a first back webbing passing around the second pin and stitched to the riser.

2. The ring release system of claim 1, wherein the ring body and the first pin are one of:
monolithic; or
removably coupled to one another.

3. The ring release system of claim 1, wherein the first release ring is configured with a J-shape when viewed in a direction sideways to the top-to-bottom direction of the riser.

4. The ring release system of claim 1, wherein the second pin is removable from the side plates to permit installation of the first release ring.

5. The ring release system of claim 1, wherein the riser comprises multiple plies, and wherein the first back webbing is stitched to the riser between plies of the riser.

6. The ring release system of claim 1, further comprising a second release ring coupled to the riser, wherein the first release ring and second release ring are cascadingly rotatable with respect to the riser responsive to release of a retaining mechanism.

7. The ring release system of claim 6, wherein at least a portion of the first release ring passes through an aperture of the second release ring due to rotation of the first release ring.

8. The ring release system of claim 6, wherein an interior width of at least one of the first release ring and the second release ring is substantially equal to a width of the riser.

9. The ring release system of claim 6, further comprising a third release ring coupled to the riser, wherein the third release ring is cascadingly rotatable with respect to the riser responsive to rotation of the second release ring.

10. The ring release system of claim 1, further comprising:
a third pin, the pair of side plates coupling the first pin, the second pin, and the third pin, wherein the first release ring is coupled to the riser via a second back webbing passing around the third pin and stitched to the riser.

11. The ring release system of claim 1, wherein at least one of:
a non-hinged end of the first release ring is bent;
the first pin, the second pin, and a first side plate of the pair of side plates are monolithic; or
the first pin and the first side plate of the pair of side plates are monolithic, and the second pin and a second side plate of the pair of side plates are monolithic.

* * * * *